United States Patent
Ota et al.

(10) Patent No.: US 7,599,031 B2
(45) Date of Patent: Oct. 6, 2009

(54) LIQUID CRYSTAL DISPLAY DEVICE

(75) Inventors: Masuyuki Ota, Mobara (JP); Sukekazu Aratani, Hitachiota (JP); Makoto Yoneya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 513 days.

(21) Appl. No.: 11/373,292

(22) Filed: Mar. 13, 2006

(65) Prior Publication Data

US 2006/0152661 A1 Jul. 13, 2006

Related U.S. Application Data

(60) Continuation of application No. 10/462,603, filed on Jun. 17, 2003, now abandoned, which is a division of application No. 09/610,102, filed on Jun. 30, 2000, now abandoned.

(51) Int. Cl.
G02F 1/1333 (2006.01)

(52) U.S. Cl. .................... 349/139; 349/144; 349/56

(58) Field of Classification Search .............. 349/139, 349/144, 56
See application file for complete search history.

(56) References Cited

U.S. PATENT DOCUMENTS

| | | | |
|---|---|---|---|
| 4,846,560 A | 7/1989 | Tsuboyama et al. | |
| 5,192,596 A | 3/1993 | Hanyu et al. | |
| 5,316,805 A | 5/1994 | Hanyu et al. | |
| 5,426,526 A | 6/1995 | Yamamoto et al. | |
| 5,729,307 A | 3/1998 | Koden et al. | |
| 5,781,262 A | 7/1998 | Suzuki et al. | |
| 5,805,247 A | 9/1998 | Oh-e et al. | |
| 5,831,707 A | 11/1998 | Ota et al. | |
| 5,844,643 A | 12/1998 | Onishi et al. | |
| 5,872,611 A | 2/1999 | Hirata et al. | |
| 5,922,242 A * | 7/1999 | Saishu et al. | 252/299.62 |
| 5,936,693 A * | 8/1999 | Yoshida et al. | 349/139 |
| 5,946,065 A | 8/1999 | Tagusa et al. | |

(Continued)

FOREIGN PATENT DOCUMENTS

EP 0749029 6/1996

(Continued)

*Primary Examiner*—Laura M Menz
(74) *Attorney, Agent, or Firm*—Stites & Harbison PLLC; Juan Carlos A. Marquez, Esq.

(57) ABSTRACT

In a liquid crystal display device capable of realizing a viewing angle equivalent to the Braun tube and for controlling display with an electric field in parallel with a substrate surface, a liquid crystal display device is provided which is less in unevenness of display and homogeneous in luminance. A liquid crystal display device has a pair of transparent substrates arranged oppositely through a liquid crystal, means for regulating a direction of initial alignment of the liquid crystal, and a pixel electrode and a counter electrode formed spaced from each other in each pixel region on a liquid crystal side surface of the transparent substrate, wherein an electric field is given between the pixel electrode and the counter electrode to thereby control an amount of light transmitting in the crystal liquid between the electrodes. A light transmissive region in the pixel region has, with respect to one region set with an angle given by an electric field direction and an initial alignment direction between the pixel electrode and the counter electrode, another region having an electric field direction and an initial alignment direction that are different in the angle.

13 Claims, 27 Drawing Sheets

U.S. PATENT DOCUMENTS

| | | | |
|---|---|---|---|
| 5,953,093 A | 9/1999 | Hirata et al. | |
| 5,956,111 A | 9/1999 | Ohta et al. | |
| 5,969,782 A | 10/1999 | Lee et al. | |
| 5,978,059 A | 11/1999 | Ohta et al. | |
| 5,986,738 A | 11/1999 | Tagusa et al. | |
| 6,011,606 A * | 1/2000 | Ohe et al. | 349/141 |
| 6,014,188 A | 1/2000 | Yamada et al. | |
| 6,014,193 A | 1/2000 | Taira et al. | |
| 6,049,396 A | 4/2000 | Wagi et al. | |
| 6,064,460 A | 5/2000 | Ohta et al. | |
| 6,081,314 A | 6/2000 | Suzuki et al. | |
| 6,100,956 A | 8/2000 | Oh-e et al. | |
| 6,108,065 A | 8/2000 | Ota et al. | |
| 6,111,627 A | 8/2000 | Kim et al. | |
| 6,141,077 A | 10/2000 | Hirata et al. | |
| 6,201,590 B1 | 3/2001 | Ohta et al. | |
| 6,201,592 B1 * | 3/2001 | Terashita et al. | 349/156 |
| 6,208,399 B1 | 3/2001 | Ohta et al. | |
| 6,219,115 B1 | 4/2001 | Nakayoshi et al. | |
| 6,221,444 B1 | 4/2001 | Okada et al. | |
| 6,266,116 B1 * | 7/2001 | Ohta et al. | 349/141 |
| 6,323,922 B1 | 11/2001 | Suzuki et al. | |
| 6,342,939 B1 | 1/2002 | Hirata et al. | |
| 6,388,725 B2 | 5/2002 | Ohta et al. | |
| 6,392,730 B2 | 5/2002 | Ohta et al. | |
| 6,407,792 B2 * | 6/2002 | Ohta et al. | 349/139 |
| 6,417,906 B2 | 7/2002 | Ohta et al. | |
| 6,433,852 B1 | 8/2002 | Sonoda et al. | |
| 6,462,799 B2 | 10/2002 | Ohta et al. | |
| 6,512,567 B2 | 1/2003 | Ohta et al. | |
| 6,515,718 B1 * | 2/2003 | Kishimoto et al. | 349/32 |
| 6,522,369 B2 | 2/2003 | Ohta et al. | |
| 6,532,053 B2 | 3/2003 | Ohta et al. | |
| 6,538,713 B1 | 3/2003 | Yanagawa et al. | |
| 6,545,653 B1 | 4/2003 | Takahara et al. | |
| 6,628,367 B2 | 9/2003 | Hirabayashi et al. | |
| 6,697,136 B1 | 2/2004 | Yasukawa | |
| 6,750,926 B2 | 6/2004 | Ohgiichi et al. | |
| 6,781,657 B1 * | 8/2004 | Kim et al. | 349/129 |
| 6,830,787 B1 * | 12/2004 | Ohe et al. | 428/1.1 |
| 6,849,309 B2 * | 2/2005 | Ohe et al. | 428/1.1 |
| 7,072,019 B1 * | 7/2006 | Kishimoto | 349/156 |
| 7,112,355 B2 * | 9/2006 | Ohe et al. | 428/1.1 |
| 7,382,382 B2 * | 6/2008 | Furukawa et al. | 345/690 |
| 2002/0039162 A1 * | 4/2002 | Ohe et al. | 349/141 |
| 2003/0128323 A1 | 7/2003 | Matsumoto et al. | |
| 2003/0201422 A1 * | 10/2003 | Ohe et al. | 252/299.01 |
| 2004/0109103 A1 * | 6/2004 | Ota et al. | 349/56 |
| 2004/0150602 A1 * | 8/2004 | Furukawa et al. | 345/98 |
| 2005/0084623 A1 * | 4/2005 | Ohe et al. | 428/1.3 |
| 2006/0097969 A1 * | 5/2006 | Tsai et al. | 345/88 |
| 2006/0152661 A1 * | 7/2006 | Ota et al. | 349/139 |
| 2006/0290848 A1 * | 12/2006 | Choi et al. | 349/114 |
| 2007/0002267 A1 * | 1/2007 | Mochizuki | 349/184 |
| 2007/0019142 A1 * | 1/2007 | Roh et al. | 349/138 |
| 2007/0076148 A1 * | 4/2007 | Yang et al. | 349/114 |
| 2007/0242209 A1 * | 10/2007 | Lin | 349/167 |
| 2007/0279541 A1 * | 12/2007 | Mochizuki et al. | 349/36 |

FOREIGN PATENT DOCUMENTS

| | | |
|---|---|---|
| EP | 0805374 | 4/1997 |
| JP | 07-244292 | 3/1994 |
| JP | 08-313923 | 9/1995 |
| JP | 9-101538 | 10/1995 |
| JP | 10-3092 | 6/1996 |
| JP | 2000214443 A * | 8/2000 |
| JP | 2002365610 A * | 12/2002 |
| WO | WO 9808136 | 2/1998 |

* cited by examiner

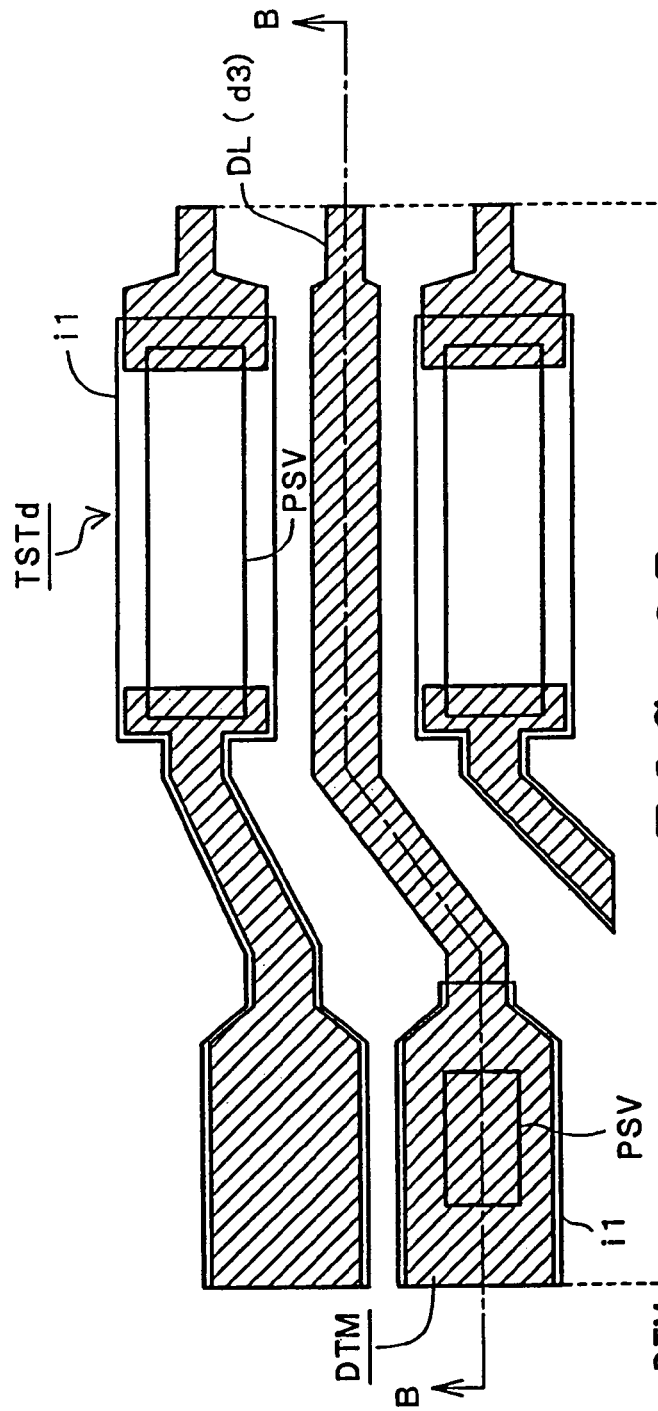

$V_G(i)$ $V_D(j)$ $V_D(j+1)$ $V_C$ $V_S(i,j)$ $V_{LC}(i,j)$

FIG. 20
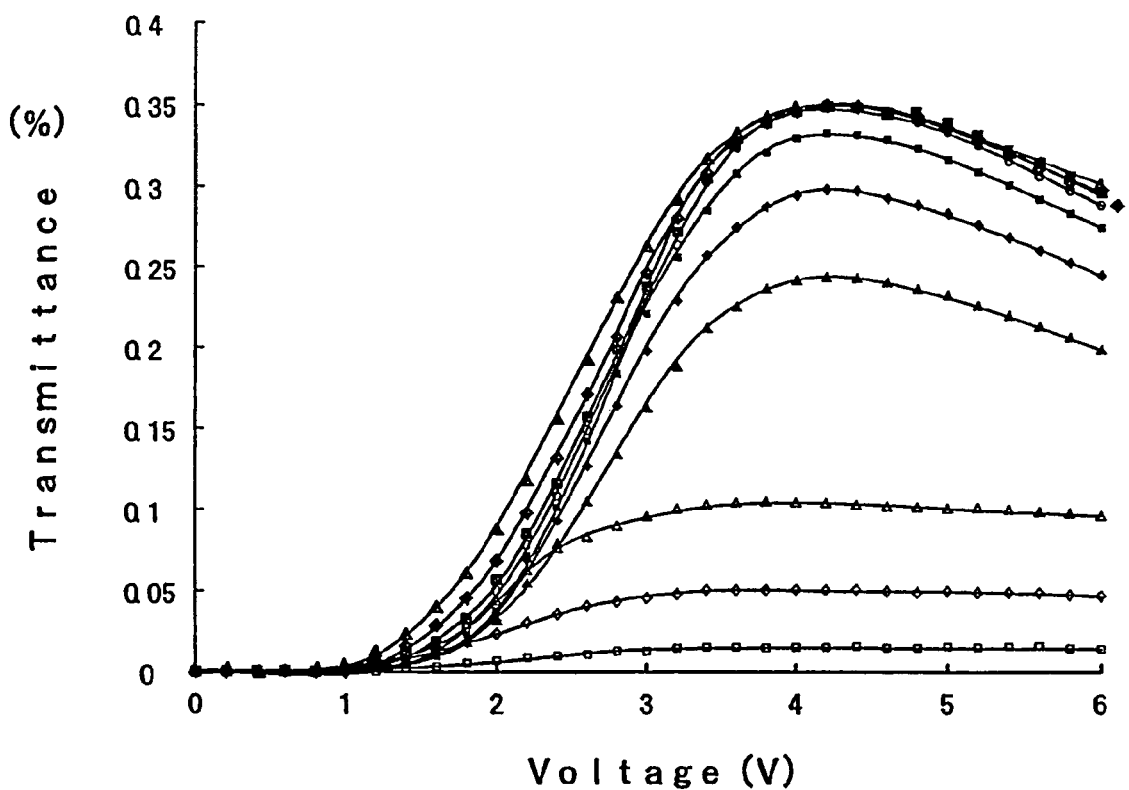
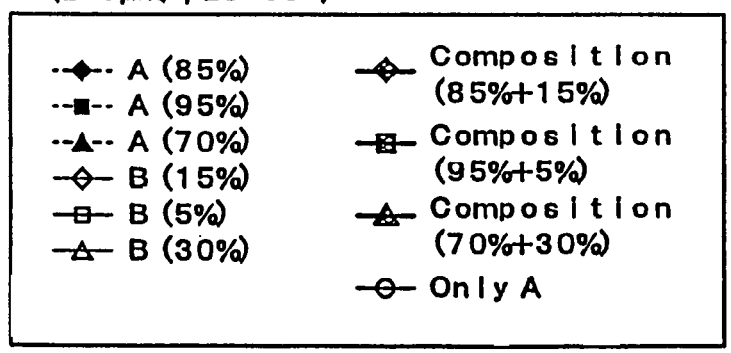

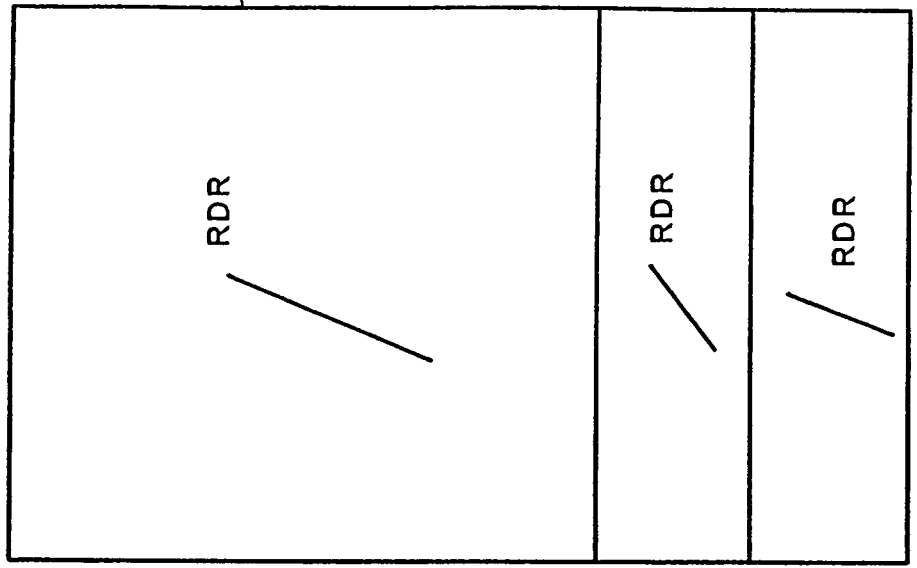
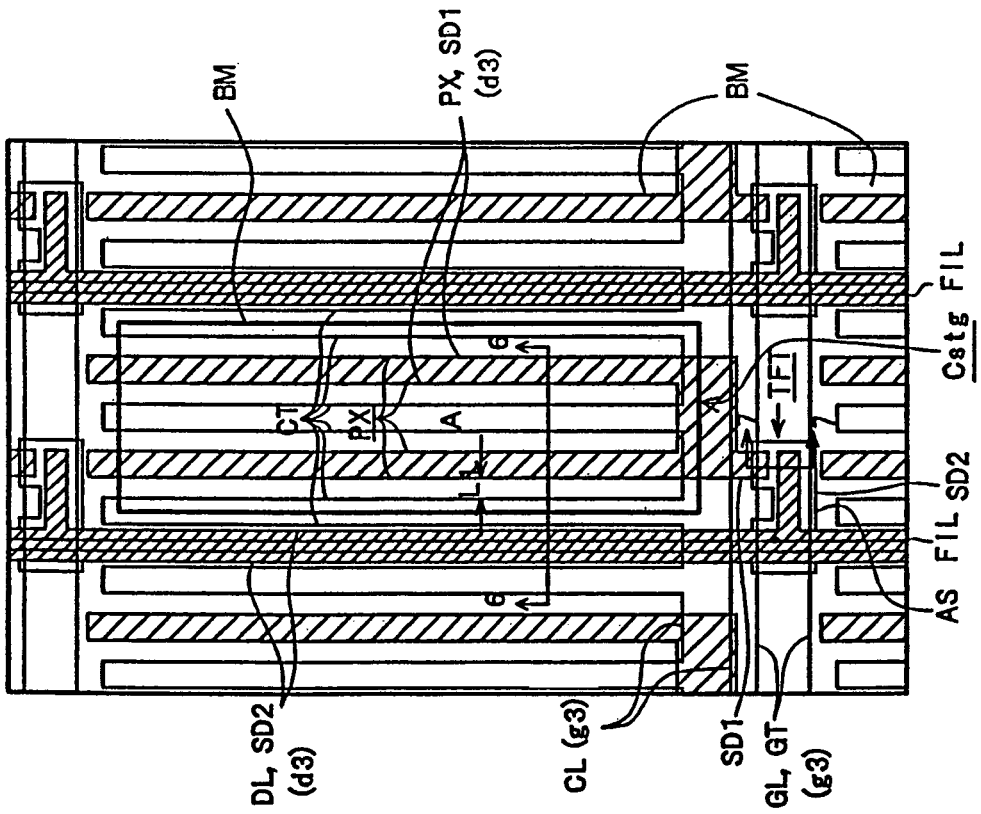

LIQUID CRYSTAL DISPLAY DEVICE

CROSS REFERENCE TO RELATED APPLICATIONS

This application is a Continuation application of U.S. application Ser. No. 10/462,603 filed Jun. 17, 2003, now abandoned which is a Divisional application of U.S. application Ser. No. 09/610,102 filed Jun. 30, 2000 now abandoned. Priority is claimed based on U.S. application Ser. No. 10/462, 603 filed Jun. 17, 2003, which claims the priority of U.S. application Ser. No. 09/610,102 filed on Jun. 30, 2000, which claims the priority of PCT/JP98/02945 filed on Jun. 30, 1998, which claims the priority date of Japanese Patent Application No. 10-54544 filed Mar. 6, 1998.

TECHNICAL FIELD

The present invention relates to liquid crystal display devices and, more particularly, to a liquid crystal display device using a lateral electric field scheme.

BACKGROUND OF THE INVENTION

Liquid crystal display devices are in widespread as display devices for portable appliances as represented by the notebook personal computers, due to the feature of thinness and light weight. In particular, the active-matrix liquid crystal display devices using active elements as represented by thin film transistor elements (TFTs) are recently becoming popular as the monitors for the desktop personal computers as well as the display terminals for office-automation appliances, etc., by virtue of the point of high image quality equivalent to the Braun tube.

However, in the liquid crystal display devices there exists a defect of narrowness of viewing angle in nature.

There is a proposal, as means for thoroughly resolving this, on the display mode called an in-plane switching mode (IPS).

Concerning the in-plane switching mode, there are disclosures, e.g. in "R. Kiefer, B. Weber, F. Windcheid and G. Baur, Proceedings of the Twelfth International Display Research Conference (Japan Display '92) pp. 547-550".

Meanwhile, besides this, there also are descriptions in "SID 97 DIGEST p 184-187", Japanese Patent Laid-open No. 62788/1998, Japanese Patent Laid-open No. 62802/1998, etc.

As apparent from the above documents, the liquid crystal display device utilizing an in-plane switching mode as above has pixel regions each formed with at least one pair of electrodes (not necessarily in integer but may be 1.5 pairs for 3 electrodes) on a surface of one transparent substrate on the side of a liquid crystal. Between these electrodes, an electric field is caused in a direction horizontal to the transparent substrate surface, thereby structurally controlling the amount of light transmitting between the electrodes.

However, it has reached assurance that in the liquid crystal display device thus structured, in each pixel, if examined for a characteristic of light transmissivity (equivalent to luminance) against a voltage (voltage difference) applied to the electrode, vary steeply in a middle tone range (0-20% in luminance).

This means that the light transmission amount greatly varies even with slight change in electrode-to-electrode voltage and, in the middle tone range, is easily discriminatable for the human eye.

Due to this, it has been reached necessary to improve the quality of display by balancing the characteristic at around the middle tone range with the characteristics in other ranges than the middle tone range.

Meanwhile, it is possible for each of the electrodes to obtain a predetermined optical transmissivity by making the spacing between them. However, the variation in photolithography or etching in forming the electrodes results unavoidably in variation of electrode spacing on each pixel.

In order to cope with this, countermeasures have been taken with improvement of photoresist materials, etch solutions, etc. such that the variation due to photolithography or etching upon forming the electrodes can be suppressed in maximum extent. However, the variation has increased with the increase in size of the liquid crystal display screen. Thus, this countermeasure is no longer to cope with.

The present invention solves the above problem, and it is an object to provide an active-matrix liquid crystal display device of an IPS scheme having a wide viewing angle equivalent to the Braun tube which is high in luminance uniformity and well in image quality without having unevenness of luminance.

DISCLOSURE OF THE INVENTION

The inventions disclosed in the present Specification include typical one the summary of which will be briefly explained in the following.

That is, the invention has a pair of transparent substrates arranged oppositely through a liquid crystal, means for regulating a direction of initial alignment of said liquid crystal, and a pixel electrode and a counter electrode formed spaced from each other in each pixel region on a liquid crystal side surface of said transparent substrate, wherein an electric field given between said pixel electrode and said counter electrode to thereby control an amount of light transmitting in said crystal liquid between said electrodes, characterized in that:

a light transmissive region in said pixel region has, with respect to one region set with an angle given by an electric field direction and an initial alignment direction between said pixel electrode and said counter electrode, another region having an electric field direction and an initial alignment direction that are different in the angle.

The liquid crystal display device structured as above is to be improved in transmissivity of light for a liquid crystal by setting to a predetermined value an angle given by an electric field direction between the pixel electrode and the counter electrode and an initial alignment direction mentioned above. It is however confirmed that, in the voltage (between the pixel electrode and the counter electrode) vs. luminance characteristic, there occurs a point great in change of optical transmissivity (luminance) against a change of voltage (point steep in characteristic curve) particularly in around a middle tone range thereof.

From this fact, the voltage vs. luminance characteristic curve for each pixel region is to be made moderate by providing, with respect to one region set in angle of the angle defined by the electric field direction between the pixel electrode and the counter electrode and the initial alignment direction, another region having an electric field direction and initial alignment direction different in the angle therefrom in a light transmissive area of each pixel region. This eliminates the point that is great in luminance change against voltage change.

That is, the luminance change can be substantially made uniform with respect to the voltage applied between the pixel electrode and the counter electrode thus improving the quality of display.

Meanwhile, where there are variations of spacing between the pixel electrode and the counter electrode in between different pixel regions, variations of luminance are ready to recognize as unevenness of brightness. However, the above structure makes it possible to blunt the luminance change with respect to the spacing variation between the pixel electrode and the counter electrode.

Due to this, even if there occurs variation in spacing between the pixel electrode and the counter electrode, the unevenness of brightness on display screen can be greatly reduced thus improving the quality of display.

In this case, by providing the other region on a premise of existence of the one region, the voltage vs. luminance characteristic curve in the pixel region can be made moderate in a state a desired voltage applied between the pixel electrode and the counter electrode is almost suppressed from rising.

Thus, the occurrence of uneven brightness can be greatly reduced without almost the need to modify the drive circuit system forming signals to be supplied to the pixel and counter electrodes.

BRIEF DESCRIPTION OF THE DRAWINGS

FIGS. 8A and 8B are plan-and-sectional views showing a vicinity of a connection point between a drain terminal DTM and an image signal line DL;

FIG. 20 is a figure showing a voltage vs. luminance characteristic of the conventional;

FIGS. 24A and 24B are structural views showing another embodiment according to the invention;

BEST MODE FOR CARRYING OUT THE INVENTION

Figure 1:
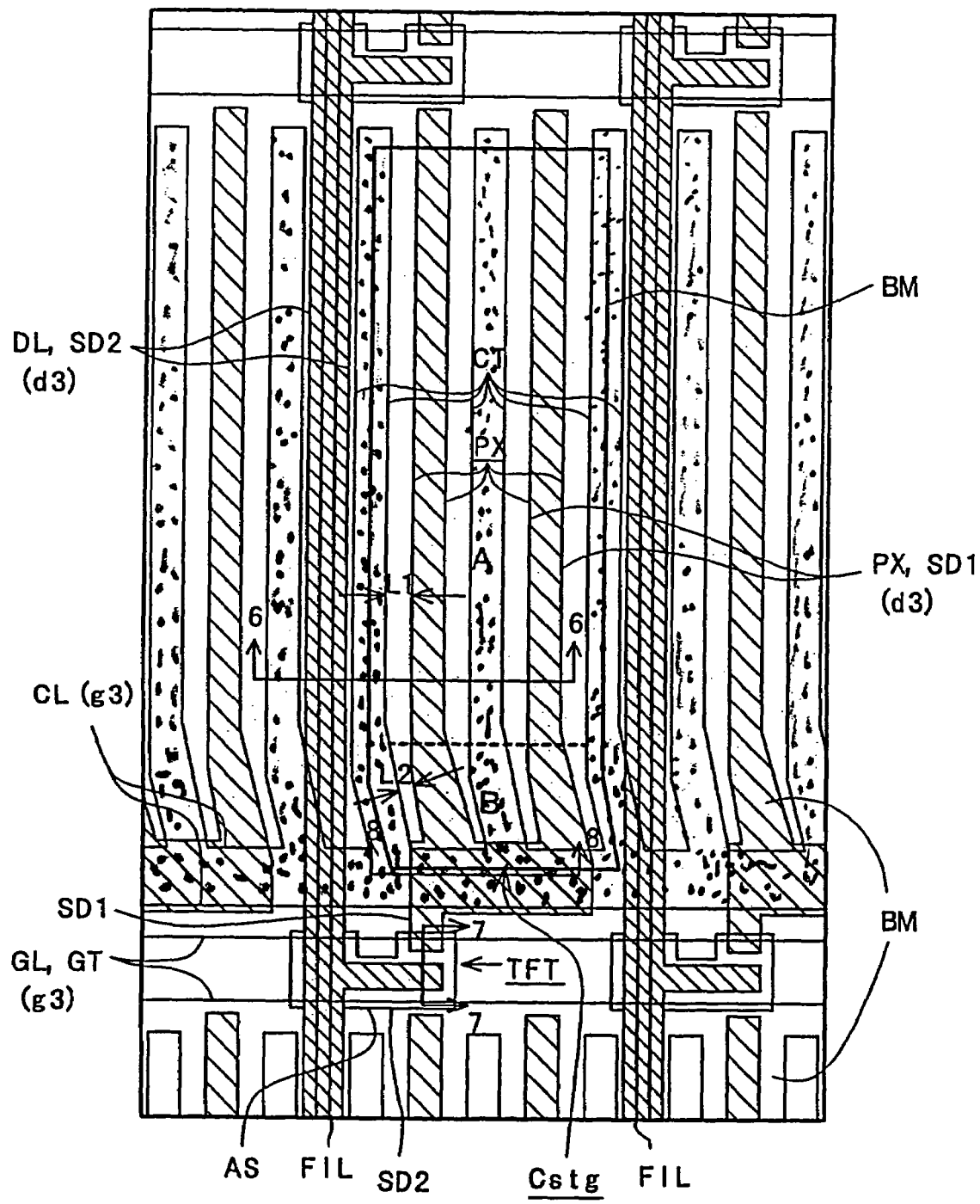
FIG. 1 is an essential part plan view showing one pixel and its periphery of a liquid crystal display part of an active-matrix color liquid crystal display device of first embodiment of the present invention.

The present invention, other objects of the invention and still another feature of the invention will become apparent from the below explanations referring to the drawings. Also, the principal object of the invention lies in devising a shape of electrodes to suppress luminance change with respect to variation in electrode dimension, i.e., making moderate the inclination of a voltage vs. luminance characteristic without raising a maximum drive voltage Vmax.

EMBODIMENT 1

<Active Matrix Liquid Crystal Display Device>

Hereunder, explanations will be made on embodiments that the present invention is applied to an active matrix schemed color liquid crystal display device. Note that in the drawings to be explained below those having the same function are denoted by the same reference numerals to omit repeated explanations thereof.

<Matrix (Pixels) Plan Structure>

FIG. 1 is a plan view showing one pixel and its periphery of an active-matrix-schemed color liquid crystal display device of the present invention.

As shown in FIG. 1, each pixel is arranged within an intersectional area (an area encompassed by four signal lines) given by a scanning signal line (a gate signal line or horizontal signal line) GL, a counter voltage signal line (a counter electrode interconnection) CL and adjacent two image signal lines (a drain signal line or vertical signal line) DL. Each pixel includes a thin film transistor TFT, a storage capacitor Cstg, a pixel electrode PX and a counter electrode CT. The scanning signal lines and the counter voltage signal line CL in the figure extend in a left-and-right direction and arranged several in number with respect to a vertical direction. The image signal lines DL extend in the vertical direction and arranged several in number in the left-and-right direction. The pixel electrode PX is electrically connected through a source electrode SD1 to the thin film transistor TFT, while the counter electrode CT is electrically connected to the-counter voltage signal line CL. Here, the scanning signal line GL is to convey a scanning signal to a thin film transistor element in each pixel, the image signal line DL is to supply an image signal voltage to a pixel electrode PX in each pixel through the thin film transistor element, and the counter voltage signal line CL is to supply a counter voltage to a counter electrode CT for each pixel.

The pixel electrode PX and the counter electrode CT are opposed to each other, and control an optical state of a liquid crystal composition LC through an electric field nearly in parallel with a substrate surface generated between each pixel electrode PX and the counter electrode CT, controlling display. The pixel electrode PX and the counter electrode CT are configured in a comb form, each of which is an electrode made elongate in the vertical direction of the figure.

In the present embodiment, within one pixel the counter electrodes CT are three in number and the pixel electrodes PX are two in number. However, this is not limitative and structure may be provided having a relationship O=P+1 wherein within one pixel the counter electrodes CT are O in count (comb finger count) and the pixel electrodes PX are P in count (comb finger count).

Here, a region of between the pixel electrode PX and the counter electrode CT is divided into two regions (A, B in FIG. 1). The region A of FIG. 1 is a principal optical switch region for the pixel of this embodiment, and the region B of FIG. 1 is an auxiliary optical switch region for moderating variation in luminance with respect to dimensional variation of electrodes. In this embodiment, the region A and the region B were given a ratio in area of approximately 1:0.15. In this embodiment, the electrode spacing L1 in the region A was approximately 10 μm in each four-divided region (error of nearly .+–0.2 μm occurs in each region). Meanwhile, the electrode spacing L2 in the region B was approximately 5 μm in each four-divided region (error of nearly .+–0.2 μm occurs in each region). Furthermore, the region B is structured with an electrode shape such that an electric field application direction EDR is inclined by approximately 15 degrees with respect to a direction parallel with the horizontal (the direction of scanning line extension). This provides an angle .phi.LC of approximately 60 degrees defined between a direction of initial alignment RDR, stated hereinafter, and a direction of an electric field EDR. Meanwhile, in the region A because the electric field application direction EDR is in parallel with the horizontal, the angle .phi.LC is approximately 75 degrees between the initial alignment direction RDR, stated hereinafter, and the electrode field application direction EDR. That is, in this embodiment the electric field application direction EDR is varied by approximately 15 degrees between the region A and the region B to vary by approximately 15 degrees the angle .phi.LC defined between the hereinafter-stated initial alignment direction RDR and the electric field application direction EDR.

Here, in the above embodiment the electrode spacing L2 in the region B (this value requires not necessarily constant but may be varied) is made narrow with respect to the electrode spacing L1 in the region A. However, the object of the invention can be achieved even with a relationship of L1=L2 without providing the relation as above at all times).

This is because, by merely providing in a region A a structure that at a point the pixel electrode PX and the counter electrode CT extend to the region B the extending direction is varied, each region is different in electric field direction, eventually making different the angle defined between the electric field direction and the initial alignment direction in each region.

By thus providing the region B, each pixel region in its entirety is made moderate in a voltage vs. luminance characteristic curve, eliminating the possibility of increasing luminance change with respect to voltage change resulting from variation in distance between the pixel electrode and the counter electrode.

Figure 22:
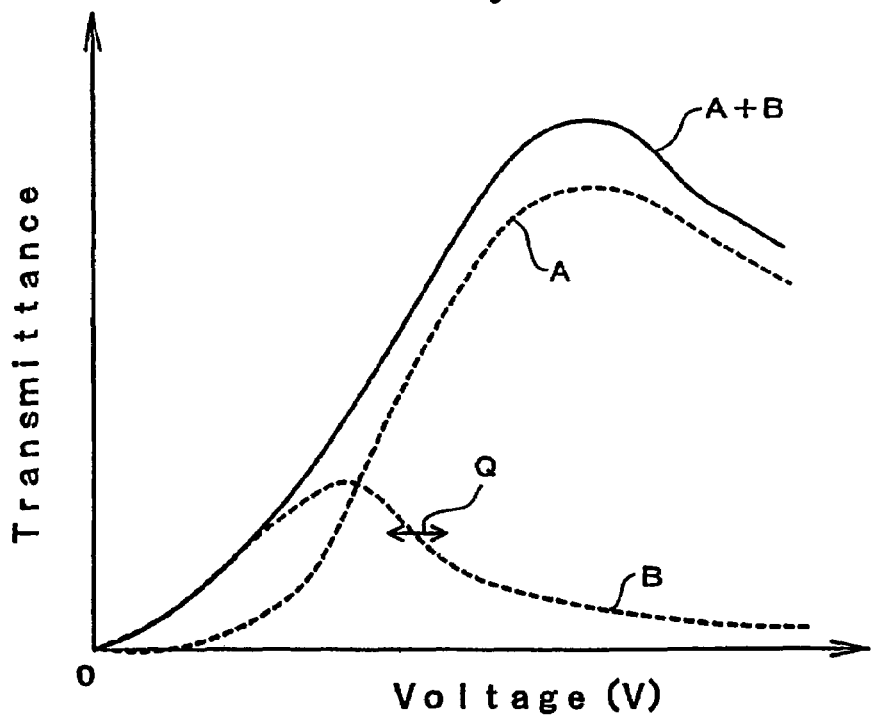
FIG. 22 is a typical graph explaining an effect of the invention.

That is, as shown in a typical graph of FIG. 22, there are a graph illustrating a characteristic of the region A and a graph illustrating a characteristic of the region B. In this case, the characteristic for the region A is a characteristic in a case of not applying the invention. It is apparent in one part thereof that there exists a steep luminance change point with respect to voltage change.

However, by providing a region B and setting the characteristic in that region as shown in the figure, the characteristic of the pixel in its entirety is given a combined characteristic with the characteristic of the region A and the characteristic of the region B. This characteristic allows for moderate luminance change relative to voltage change.

Consequently, even where in each pixel region there is variation occurring in distance between the pixel electrode PX and the counter electrode CT, it is possible to greatly reduce the unevenness in luminance on a display screen and improve the quality of display.

Meanwhile, in this embodiment the distance between the pixel electrode PX and the counter electrode CT is made smaller in the region B than in the region A because of the following reason.

That is, the changing of electric field direction in the region B is meant to newly form a voltage vs. luminance characteristic in the region. However, by varying the distance between the pixel electrode PX and the counter electrode CT, the voltage vs. luminance characteristic is to be shifted delicately in a voltage direction (a direction of arrow Q in FIG. 22). This facilitates control in obtaining a predetermined voltage vs. luminance characteristic in the pixel region.

Meanwhile, in the above embodiment the area ratio of the region A and the region B was given as approximately 1:0.15. However, this is not necessarily limitative. The aim of providing a region B is to make moderate the voltage vs. luminance characteristic in the pixel region as compared to that in the region A. This if met is satisfactory.

In this embodiment, however, it has been ascertained that the area of the region B is preferably within a range of 0.05 times to 0.3 times the area of the region A as described later. This is because of the reason that the unevenness in luminance was revealed greatest in a medium tone range (luminance 0 to 20%) and the above area ratio was ascertained satisfactory in blunting the sensitivity for dimensional variation around that. Also, in the above embodiment the pixel electrode PX and the counter electrode CT are varied in extension direction between the region A and the region B, thereby varying the direction of electric field in each region.

However, the invention is not limited to this. For example, it is of course possible as shown in FIG. 23 to change the pattern on one of the pixel electrode PX and the counter electrode CT (the pixel electrode PX in the figure).

This is because this case also results in change in electric field direction in the region B with respect to that of the region A as shown in the arrow P of the figure.

From a similar point of view, it is needless to say that the pattern may be changed on both the pixel electrode PX and the counter electrode CT.

Figure 23:
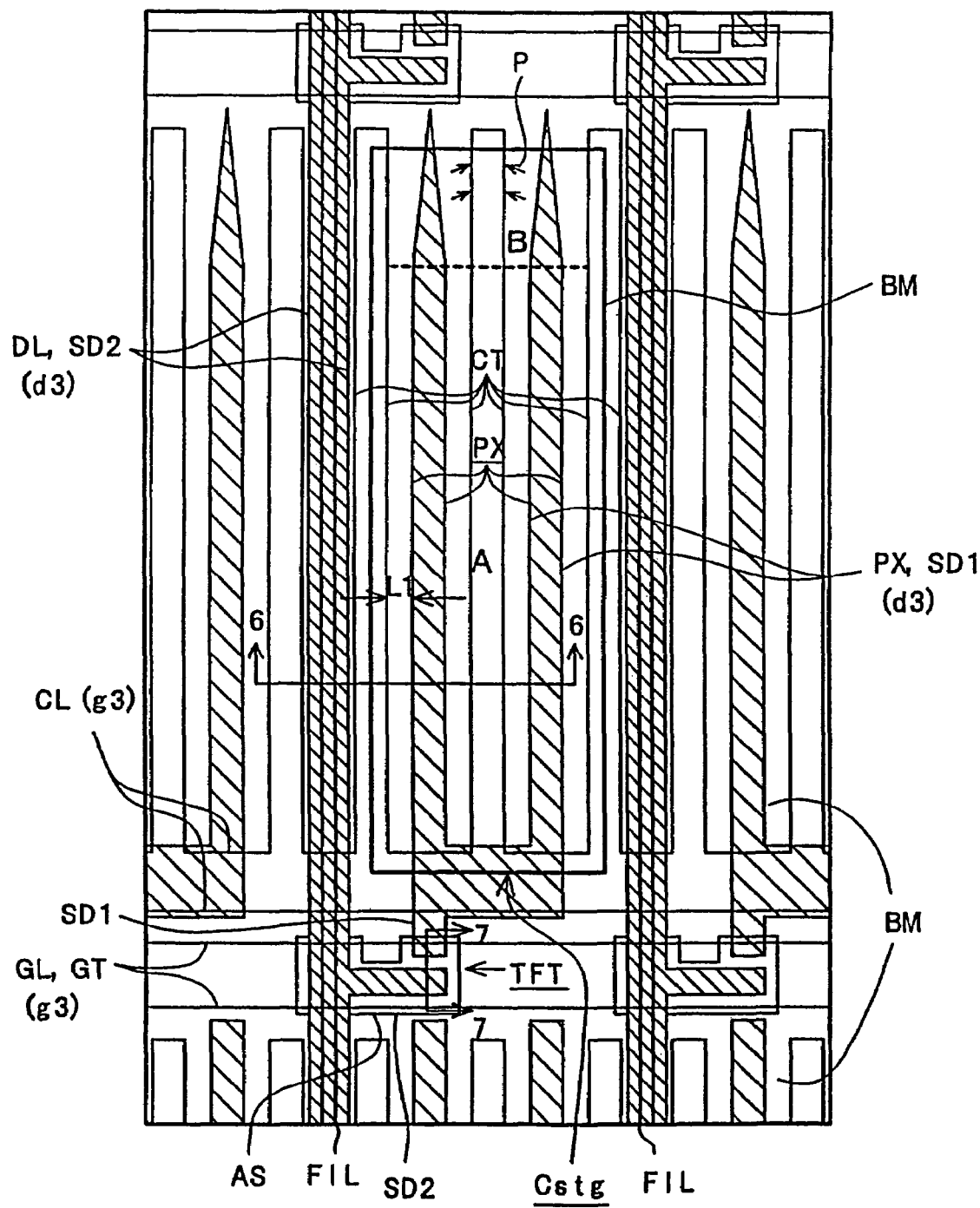
FIG. 23 is a structural view showing another embodiment according to the invention.

Meanwhile, In FIG. 23 the region B is different in position within the pixel region as compared to that of FIG. 1. There is no need to especially limit the position of the region B and to limit to one site. Sporadic formation also provides similar effects.

It should be noted that the electrode spacing between the pixel electrode PX and the counter electrode CT is varied depending on a liquid crystal material used. This is because the electric field intensity for achieving a maximum transmissivity differs depending on the liquid crystal material. The electrode spacing is set in accordance with a liquid crystal material to obtain a maximum transmissivity in a range of a maximum amplitude of a signal voltage to be set by a withstand voltage of an image signal drive circuit used (driver on a signal side).

<Matrix (Pixel) Sectional Structure>

Figure 2:
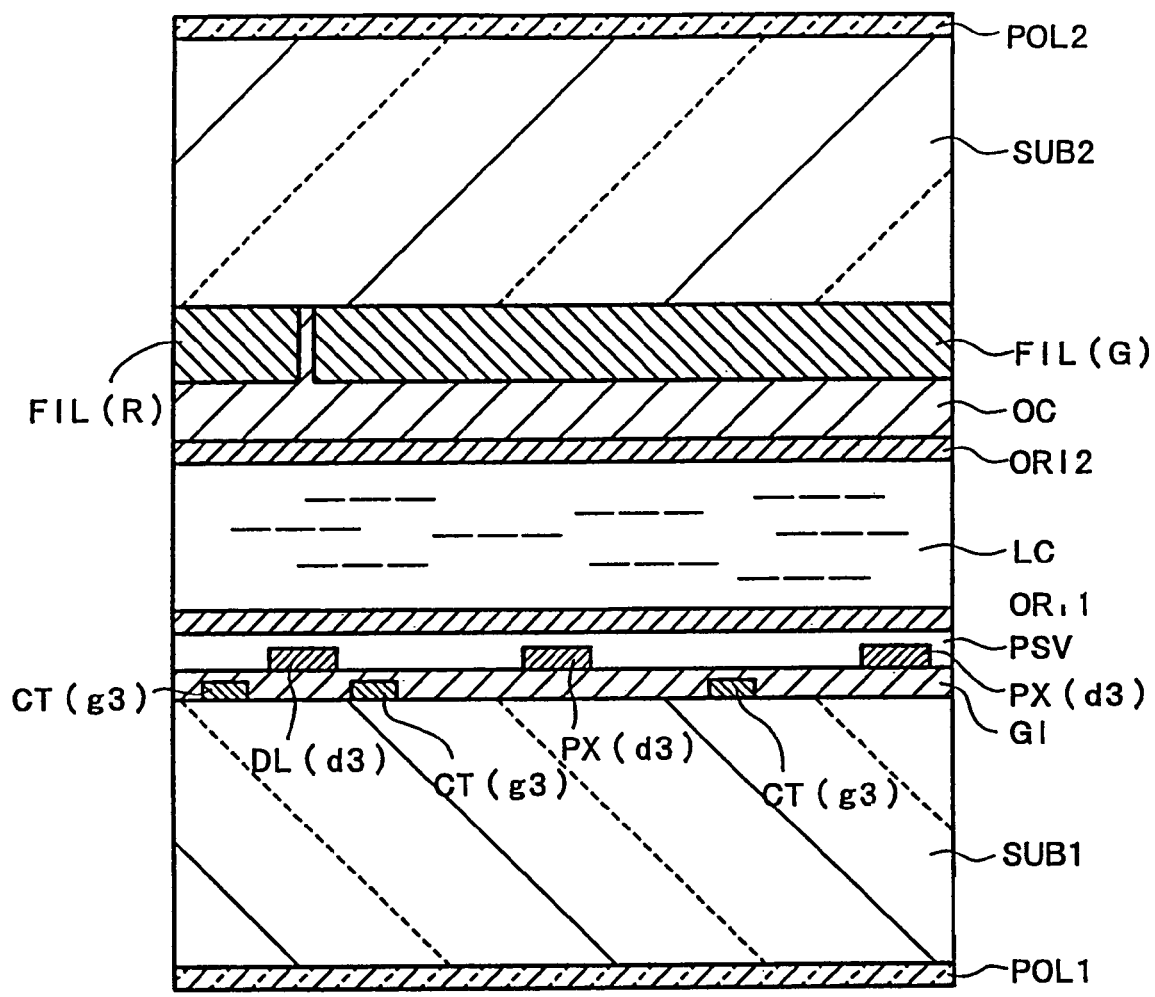
FIG. 2 is a sectional view of the pixel on cut line 6-6 in FIG. 1.
Figure 3:
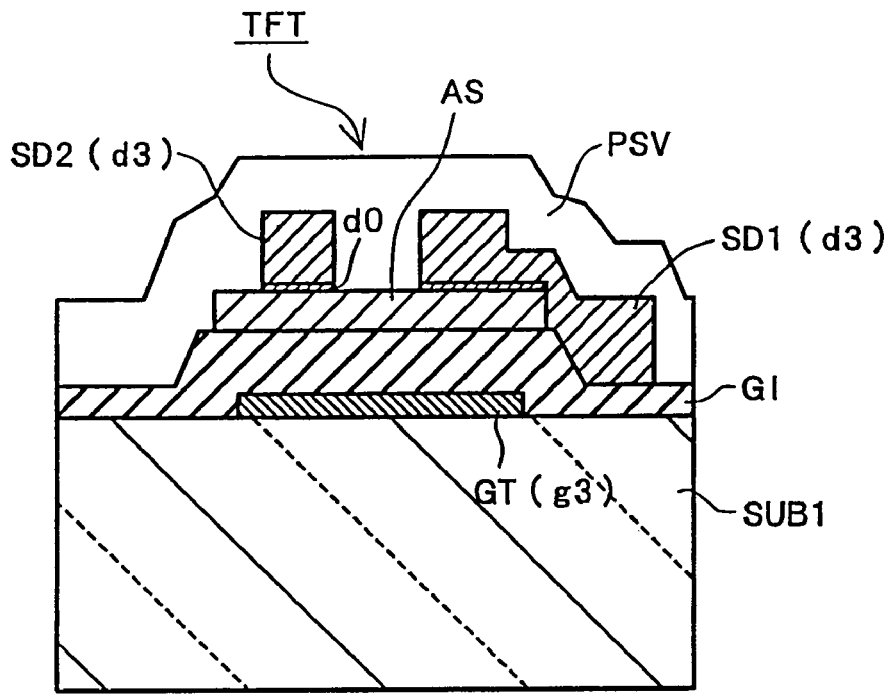
FIG. 3 is a sectional view of a thin film transistor element (TFT) on cut line 7-7 in FIG. 1.
Figure 4:
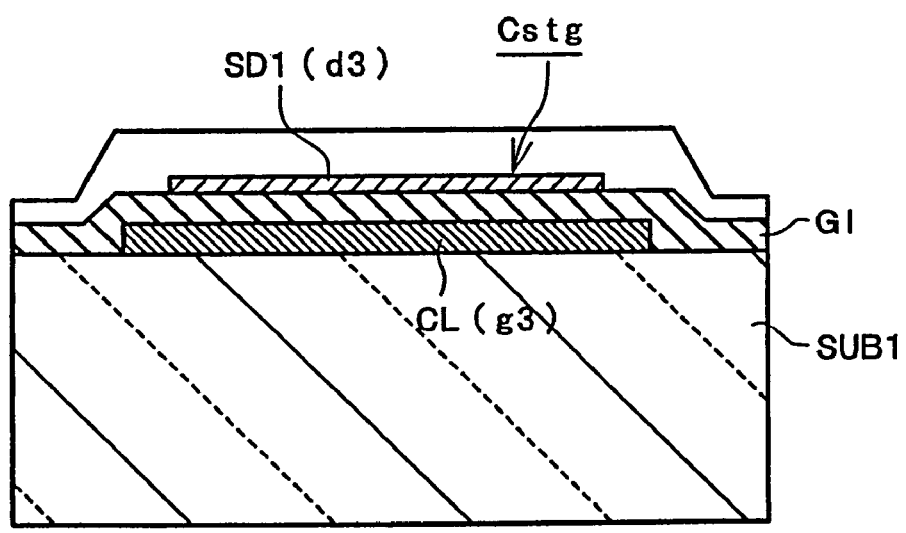
FIG. 4 is a sectional view of a storage capacitor Cstg on cut line 8-8 in FIG. 1.

FIG. 2 is a view showing a section on cut line 6-6 in FIG. 1, FIG. 3 is a sectional view of the thin film transistor TFT on cut line 7-7 in FIG. 1, and FIG. 4 is a view showing a section of the storage capacitor Cstg on cut line 8-8 in FIG. 1. As shown in FIG. 2 to FIG. 4, with respect to a liquid crystal composition layer LC as a reference, thin film transistors TFT, storage capacitors Cstg and electrode groups are formed on a side of a lower transparent glass substrate SUB1 while color filters FIL and shading black matrix patterns BM are formed on a side of an upper transparent glass substrate SUB2.

Meanwhile, the transparent glass substrates SUB1, SUB2 have, on their inner surfaces (on the liquid crystal LC side), respective orientation films ORI 1, ORI 2 to control initial alignment direction in the liquid crystal. The transparent glass substrates SUB1, SUB2 have, on their outer surfaces, respective polarizing plates POL 1, POL 2.

<TFT Substrate>

First, concretely explained is a structure on a side of a lower transparent glass substrate SUB1 (a TFT substrate).

<Thin Film Transistors TFT>

The thin film transistor TFT operates to decrease in channel resistance between a source and a drain when applied by a positive bias to a gate electrode GT, and increase in channel resistance between the source and the drain when the bias is rendered zero.

The thin film transistor TFT has, as shown in FIG. 3, a gate electrode GT, an insulator film GI, an i-type semiconductor layer AS formed of i-type (intrinsic, not doped with a conductivity determining impurity) amorphous silicon (Si), and a pair of a source electrode SD1 and a drain electrode SD2. Note that the source and drain in nature are determined by a bias polarity between them. It is to be understood that the source and drain are replaced with each other during operation because during operation the polarities thereof are to be inverted in the present liquid crystal display device circuit. In the below explanation, however, one is represented as a source and the other as a drain, for the sake of convenience.

<Gate Electrode GT>

The gate electrode GT is formed continuing the scanning signal line GL, and structured such that part of the scanning signal line GL forms the gate electrode GT. The gate electrode GT is a part beyond an active region of the thin film transistor TFT. In this example, the gate electrode GT is formed by a single-layered conductor film g3. The conductor film g3 uses a chromium-molybdenum alloy (Cr—Mo) film formed, for example, by sputtering, which however is not limitative. Alternatively, different kinds of metals may be formed in two layers.

<Scanning Signal Line GL>

The scanning signal line GL is structured by a conductor film g3. The conductor film g3 for the scanning signal line GL is formed in the same manufacturing process as the conductor film g3 for the gate electrode GT, and structured integral therewith. Through the scanning signal line GL, a gate voltage (a scanning voltage) Vg is supplied from an external circuit to the gate electrode GT. In this example, the conductor film g3 uses a chromium-molybdenum alloy (Cr—Mo) film formed, for example, by sputtering. Meanwhile, the scanning signal line GL and the gate electrode GT are not limited to chromium-molybdenum alloy but may be in a two-layered structure having aluminum or aluminum alloy covered by cromium-molybdenum in order to reduce resistance. Furthermore, this line in an intersection with the image signal line DL is made thin in order to reduce the probability of short-circuit to the image signal line DL, or may be in a bifurcate form in order for being cut off by laser trimming in the event of short-circuiting.

<Counter Voltage Signal Line CL>

The counter voltage signal line CL is structured by a conductor film g3. The conductor film g3 for the counter voltage signal line CL is formed in the same manufacturing process of the conductor film g3 for the gate electrode GT, scanning signal line GL and counter electrode CT, and formed integral with the counter electrode CT. Through the counter voltage signal line CL, a counter voltage Vcom is supplied from an external circuit to the counter electrode CT. Meanwhile, the counter voltage signal line CL is not limited to chromium-molybdenum alloy, but may be in a two-layered structure having aluminum or aluminum alloy covered by chromium-molybdenum in order to reduce resistance. Furthermore, this line in an intersection with the image signal line DL is made thin in order to reduce the probability of short-circuit to the image signal line DL, or may be in a bifurcate form for being cut off by laser trimming in the event of short-circuiting.

<Insulator Film GI>

The insulator film GI is used as a gate dielectric film of a thin film transistor TFT to provide, together with a gate electrode GT, electric field to a semiconductor layer AS. The insulator film GI is formed in an upper layer of the gate electrode GT and scanning signal line GL. For the insulator film GI, a silicon nitride film formed for example by plasma CVD is selected and formed in a thickness of 2000 to 4500 angstroms (approximately 3500 angstroms in this embodiment). Also, the insulator film GI serves also as an interlayer insulation film between the scanning signal line GL and counter voltage signal line CL and the image signal line DL, contributing to electric insulation for them.

<i-Type Semiconductor Layer AS>

The i-type semiconductor layer AS is of amorphous silicon formed in a thickness of 150 to 2500 angstroms (a film thickness of approximately 1200 angstroms in this embodiment). A layer d0 is an N(+) type amorphous silicon semiconductor layer doped with phosphorus (P) for ohmic contact, and left only in an area where an i-type semiconductor layer AS exists as an underlying layer and a conductor layer d3 exists as an overlying layer.

The i-type semiconductor layer AS and the layer d0 are also provided both the intersections (crossover points) of the scanning signal line GL and counter voltage signal line CL and the image signal line DL. The i-type semiconductor layer AS at the interconnections reduces short-circuit between the scanning signal line GL and counter voltage signal line CL and the image signal line DL.

<Source Electrode SD1, Drain Electrode SD2>

The source electrode SD1 and the drain electrode SD2 are both structured by a conductor film d3 in contact with the N(+) type semiconductor layer d0.

The conductor film d3 uses a chromium-molybdenum alloy (Cr—Mo) formed in a thickness of 500 to 3000 angstroms (approximately 2500 angstroms in this embodiment). The Cr—Mo film is low in stress and hence can be formed comparatively great in film thickness thus contributing to interconnect resistance decrease. Also, the Cr—Mo film is favorable in adhesion to the N(+) type semiconductor layer d0. The conductor film d3 may use, besides a Cr—Mo film, a refractory metal (Mo, Ti, Ta, W) film or a refractory metal silicide ($MoSi_2$, $TiSi_2$, $TaSi_2$, $Wsi_2$). Otherwise, a stack structure with aluminum or the like is satisfactory.

<Image Signal Line DL>

The image signal line DL is structured by a conductor film d3 in an same layer as the source electrode SD1 and drain electrode SD2. Also, the image signal line DL is formed integral with the drain electrode SD2. In the present example, the conductor film d3 uses a chromium-molybdenum alloy (Cr—Mo) film formed by sputtering, and formed in a thickness of 500 to 3000 angstroms (approximately 2500 angstroms in this embodiment). The Cr—Mo film is low in stress and hence can be formed comparatively great in film thickness thus contributing to interconnect resistance decrease. Also, the Cr—Mo film is favorable in adhesion to the N(+) type semiconductor layer d0. The conductor film d3 may use, besides a Cr—Mo film, a refractory metal (Mo, Ti, Ta, W) film or a refractory metal silicide ($MoSi_2$, $TiSi_2$, $TaSi_2$, $Wsi_2$). Otherwise, a stack structure with aluminum or the like is satisfactory.

<Storage Capacitor Cstg>

The conductor film d3 is formed in a manner overlapping with the counter voltage signal line CL in an area of the source electrode SD1 of the thin film transistor TFT. This overlap constitutes, as apparent from FIG. 5, for the storage capacitor (electrostatic capacitor element) Cstg having the source electrode SD1 (d3) as one electrode and the counter voltage signal line CL as the other electrode. This storage capacitor Cstg has a dielectric film structured by the insulator film GI used as the gate insulation film for the thin film transistor TFT.

As shown in FIG. 1, the storage capacitor Cstg in planar is formed in part of the counter voltage signal line CL.

<Protective Film PSV1>

A protective film PSV,PSV1 is provided over the thin film transistor TFT. The protective film PSV,PSV1 is formed mainly for protecting the thin film transistor from humidity or the like, and uses a material high in transparency and well in humidity resistance. The protective film PSV,PSV1 is formed by a silicon oxide film or silicon nitride film formed, for example, in a plasma CVD apparatus, and formed in a film thickness of approximately 0.1 to 1 μm.

The protective film PSV,PSV1 is removed in a manner exposing external connection terminals DTM and GTM. As for the thickness relationship between the protective film PSV,PSV1 and the insulator film GI, the former is made thick in consideration of a protection effect and the latter the transistor mutual conductance gm is made thin.

Also, the protective film PSV,PSV1 may be in a stacked structure with an organic film structured thick of polyimide or the like.

<Pixel Electrode PX>

The pixel electrode PX is formed integral with the source electrode SD1. Here, the electrode is curved in a V-shaped in order to make different the electric field application direction EDR in between the region A and the region B as mentioned above.

<Counter Electrode CT>

The counter electrode CT is formed integral with the counter electrode signal line CL. Here, similarly to the pixel electrode, the electrode is curved in a V-shaped in order to make different the electric field application direction EDR in between the region A and the region B as mentioned above.

The counter electrode CT is structured to be applied with a counter voltage Vcom. In the present embodiment, the counter voltage Vcom is set at a potential low by a feed through voltage ΔVs to be generated upon turning the thin film transistor element TFT into off state from an intermediate current potential between a minimum level drive voltage Vdmin and a maximum level drive voltage Vdmax applied to the image signal line DL. However, where a power source voltage of an integrated circuit used in the image signal drive circuit is desirably reduced to a half, an alternating current may be applied.

<Color Filter Substrate>

Next, referring back to FIG. 1 and FIG. 2, concrete explanation is made on a structure on a side of the upper transparent glass substrate SUB2 (a color filter substrate).

<Shade Film BM>

On a side of the upper transparent glass substrate SUB2, a shade film BM (so-called a black matrix) is formed as a BM boundary line shown in FIG. 1, in order not to emit the transmission light through unwanted gaps (gaps except for that between the pixel electrode PX and the counter electrode CT) toward a display surface and reduce the contrast ratio or the like. The shade film BM also plays a role of not allowing external light or backlight to be incident onto the i-type semiconductor layer AS. That is, the i-type semiconductor layer AS of the thin film transistor TFT is sandwiched by the upper and lower shade film BM and size-increased gate electrode GT thus being free from exposure by external natural light or backlight.

This provides each pixel region with light transmissive area defined by the shade film BM. The light transmissive area serves as a substantial pixel region.

The shading film BM shown in FIG. 1 shows only one pixel but all the pixel are each formed with an aperture at an inside thereof. Also, this pattern is mere one example. In an area the direction of electric field disturbs at a comb-like electrode end or the like, the display at that area corresponds to in-pixel image information in a one-to-one relation wherein black is given in a case of black and white in a case of white. Accordingly, it is possible to utilize as part of display.

However, the shade film BM must have shieldability against light. Particularly, in the gap between the pixel electrode PX and the counter electrode CT, optical concentration of 3 or higher is required in order to suppress crosstalk (vertical smear) in a direction of the image signal line. Also, although a conductive metal such as Cr may be used in formation, it is preferred to form with a highly-insulative film not to affect electric field present between the pixel electrode PX and the counter electrode CT. In the present embodiment, black organic pigment is mixed in resist material to form in a thickness of 1.2 μm. Also, in order to improve shieldability against light, carbon, oxide titanium ($T_xO_y$) may be mixed in a range that insulatability be kept at $10^8$ □cm or higher without having an effect upon the electric field in a liquid crystal composition layer. Also, the shade film BM partitions for effective display regions on each row and has a role to make distinct the contour of pixels on each row.

On a vertical boundary line in FIG. 1, particularly in upper area, correspondence is provided in one-to-one relation to in-pixel image information, and black is given for a case of black and white for a case of white, enabling utilization as part of display. Meanwhile, a boundary line in a left-right direction in the figure is determined by the accuracy of aligning the upper and lower substrate. Where the alignment accuracy is higher than an electrode width of the counter electrode CT adjacent to the image signal line DL, setting in a width of the counter electrode enlarges the opening. That is, it is satisfactory for the vertical boundary line to shade at least the area of the thin film transistor TFT while the boundary line in the left-right direction if set between a width of the counter electrodes on both sides of the image signal line can provides utmost improvement in opening ratio.

The shade film BM is also formed in a picture frame form in a peripheral area, whose pattern is formed continuous with the matrix part pattern shown in FIG. 1. The shade film BM in the periphery extends to an outside of a sealing area SL, preventing leak light such as reflection light resulting from mounting machine such as a personal computer from entering the matrix area and also light such as backlight from leaking outside the display area. On the other hand, this shade film BM is terminated at an inside by approximately 0.3 to 1.0 mm of an edge of the substrate SUB2 and formed avoiding at cutting regions on the substrate SUB2.

<Color Filter FIL>

A color filter FIL is formed in a stripe form with repetition of red, green and blue in areas opposed to the pixels. The color filter FIL is formed in a manner overlapping with the area of the shade film BM.

The color filter FIL can be formed in the following procedure. First, a pigment base material such as of acrylic resin is formed on the surface of the upper transparent substrate SUB2. Then, the pigment base material is removed in areas other than red filter forming areas by a photolithography technique. Thereafter, the pigment base material is dyed with a red pigment and subjected to a set process thus forming a red filter R. Next, similar processes are conducted to form a green filter G and a blue filter B in order. Incidentally, a dye may be used in dying.

<Overcoat Film OC>

An overcoat film OC is provided to prevent the dye of the color filter FIL from leaking into the liquid crystal composition layer LC and planarize the step caused by the color filter FIL and the shade film BM. The overcoat film OC is formed, for example, of a transparent resin material, e.g. an acrylic resin, an epoxy resin or the like. Also, the overcoat film OC may use an organic film such as polyimide well in fluidity.

<Liquid Crystal Layer and Polarizing Plate>

Next, explanations are made on a liquid crystal layer, an orientation film, a polarizing plate or the like.

<Liquid Crystal Layer>

Next, the liquid crystal composition LC employs a nematic liquid crystal having a dielectric constant anisotropy $\Delta.\epsilon$psilon. in a positive value of 13.2 and refractivity anisotropy $\Delta n$ of 0.081 (589 nm, 20.degree. C.). The liquid crystal composition layer is in a thickness (gap) of 3.8 µm and a retardation $\Delta n.$multidot.d of 0.31 µm. The retardation value $\Delta n.$multidot.d is set between 0.25 µm and 0.35 µm, preferably between 0.28 µm and 0.32 µm, and combined with a hereinafter-referred orientation film and polarizing plate so that a maximum transmissivity can be obtained when liquid crystal molecules are turned from an initial alignment direction to an electric field direction by 45 degrees and transmission light almost free of wavelength dependency within a range of the visible portion of light can be obtained.

Meanwhile, the thickness (gap) of the liquid crystal composition layer is controlled by polymer beads processed of vertical orientation. This stabilizes the orientation of liquid crystal molecules around beads during black display thus obtaining favorable black level and improving contrast ratio.

Incidentally, the liquid crystal material LC is not especially limited and the dielectric constant anisotropy $\Delta.\epsilon$psilon. may be negative. The dielectric constant anisotropy $\Delta.\epsilon$psilon. if greater in value can reduce drive voltage, and the refractivity anisotropy $\Delta n$ if smaller can increase the thickness (gap) of a liquid crystal layer thus shortening a liquid crystal filling time and reducing gap variation.

Also, the specific resistance of the liquid crystal composition uses a range of between $10^9 \Omega$ and $10^{14} \Omega$, preferably $10^{11} \Omega$ and $10^{13} \Omega$. In the present scheme, even if the liquid crystal composition is low in resistance, the voltage charged between the pixel electrode and the counter electrode can be sufficiently held wherein the lower limit is $10^9 \Omega$, preferably $10^{11} \Omega$. This is because the pixel electrode and the counter electrode are structured on the same substrate. Also, because the resistance is excessively high, the static electricity introduced during manufacture process can be less reduced, it is preferably $10^{14} \Omega$ or less, preferably $10^{13} \Omega$ or less.

<Orientation Film>

Figure 18:
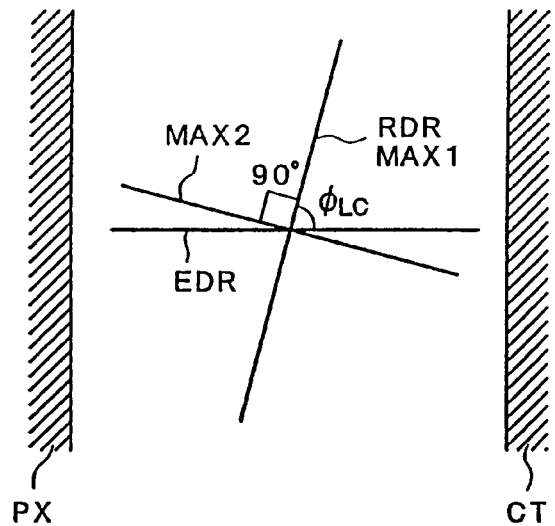
FIG. 18 is a figure showing a relationship between an application electric field direction, a rubbing direction and a polarizing plate transmission axis.
Figure 19:
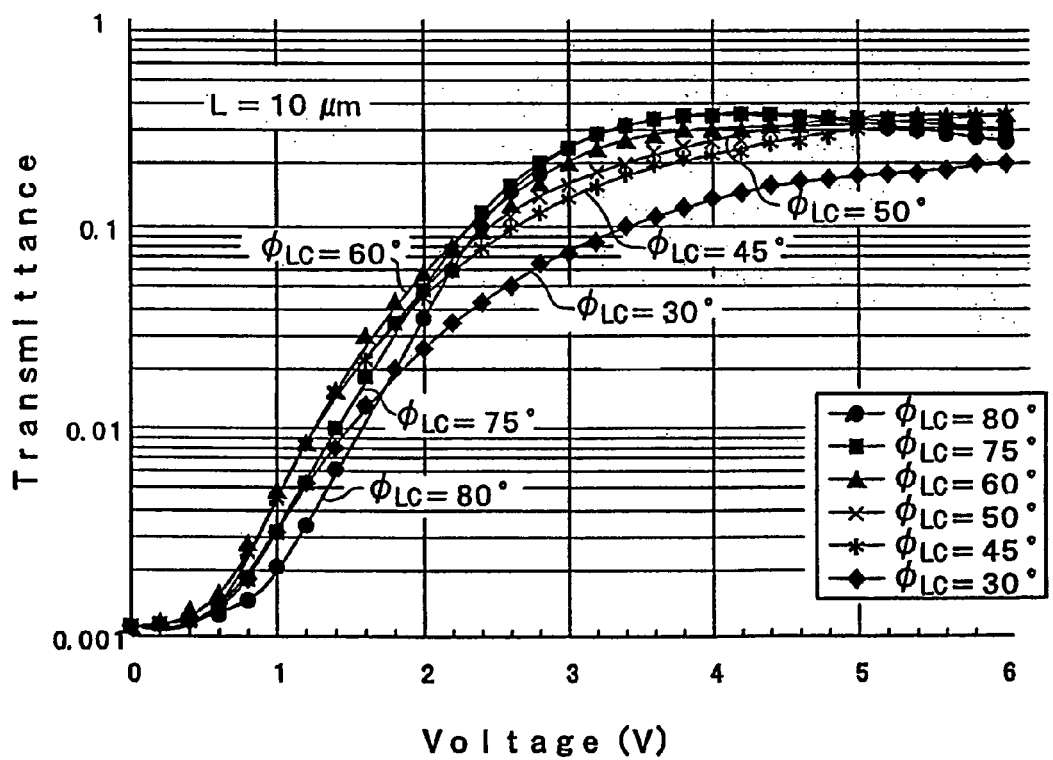
FIG. 19 is a figure showing a voltage vs. luminance characteristic (expressed in logarithm) of the conventional.

The orientation film ORI uses polyimide. An initial alignment direction RDR is in parallel on the upper and lower substrate. Although the way for providing initial alignment direction is by rubbing, there is oblique evaporation as another. The relationship between an initial alignment direction RDR and an electric field application direction EDR is shown in FIG. 18.

In the present embodiment, the initial alignment direction RDR was provided as approximately 75 degrees with respect to a horizontal direction. This provides the region A of FIG. 1 with an angle 75 degrees defining between the initial alignment direction RDR and the electric field application direction EDR, and the region B with an angle 60 degrees defining between the initial alignment direction RDR and the electric field application direction EDR.

However, the above values are not necessarily limitative in view of the object of the invention that the voltage for obtaining a maximum transmissivity in a voltage vs. luminance characteristic is low in the pixel region and a characteristic is made moderate around 10% of the relative transmissivity. It was confirmed satisfactory that in the region A the angle of between an electric field direction and an initial alignment direction is greater than 70 degrees in order to lower the voltage of obtaining a maximum transmissivity and in the B region the angle between an electric field direction and an initial alignment direction is within a range of between 30 degrees and 75 degrees in order to moderate the characteristic at around a relative transmissivity of 10%.

Note that the angle of between an initial alignment direction RDR and an electric field application direction EDR if the liquid crystal material has a positive dielectric constant anisotropy $\Delta.\epsilon$psilon. should be less than 90 degrees and if a negative dielectric constant anisotropy $\Delta.\epsilon$psilon. exceed 0 degree.

Here, this embodiment formes, for each pixel region, the region B by bending the pixel electrode PX and counter electrode CT extending in the region A, as shown in FIG. 1. However, without providing such structure a similar effect is to be obtained by working part of the orientation film ORI.

That is, as shown in FIG. 24A the pixel region structure on the transparent substrate SUB1 has no devising on the pixel electrode PX and counter electrode CT. Rather, as shown in FIG. 24B, the orientation film ORI in an area corresponding to the B region in the pixel region is given an initial alignment direction different from that in the region A.

This makes the angle of between the electric field direction and the initial alignment direction in the region A different from the angle of between the electric field direction and the initial alignment direction in the region B, hence making moderate the voltage vs. luminance characteristic in the pixel region and reducing the unevenness of luminance caused by variation in the spacing between the pixel electrode PX and the counter electrode CT.

There is, for example, the following way for forming such an orientation film for the B region.

First, after forming a polyimide coat film, rubbing is conducted over the entire area in a direction of initial alignment as set in the region A. A photoresist film is formed all over the rubbed surface to form an opening in an area corresponding to the region B by a well-known photolithography technique. Furthermore, rubbing is conducted in a predetermined direction (in a direction different from the initial alignment direction) over the surface of the photoresist film thereby rubbing the polyimide in an exposed area (region B) from the opened photoresist film. Then, the photoresist film is removed away.

Incidentally, in also this case, it is needless to say that the respective ones of electrode width of the pixel electrode PX and the counter electrode CT in the region B are made greater than those in the region A so that a predetermined voltage vs. luminance characteristic can be easily obtained by controlling the spacing between the pixel electrode PX and the counter electrode CT due to the control in the electrode width.

<Polarizing Plate>

The polarizing plate POL uses a polarizing plate having a conductivity. The lower polarizing plate POL1 is put coincident in polarizing transmission axis MAX1 with the initial alignment direction RDR while the upper polarizing plate POL2 in polarizing transmission axis MAX2 is in orthogonal thereto. FIG. 18 shows a relationship of the same. Due to this, a normally close characteristic is obtainable that the transmissivity increases with increase in the voltage applied to the pixel of the invention (voltage between the pixel electrode PX and the counter electrode CT). Also, when no voltage is applied, a high quality black display is possible.

Incidentally, in the present embodiment a countermeasure is done against poor display due to external static electricity and EMI by providing conductivity to the polarizing plate. Concerning conductivity, it is preferred to give a sheet resistance of $10^8$ μ/.quadrature. or less for only coping with the affection of static electricity, or $10^4$ μ/.quadrature. or less if coping also with EMI. Also, a conductor layer may be provided on a backside of a surface of the glass substrate sandwiching the liquid crystal composition (surface to be adhered with the polarizing plate).

<Structure in Periphery of Matrix>

Figure 5:
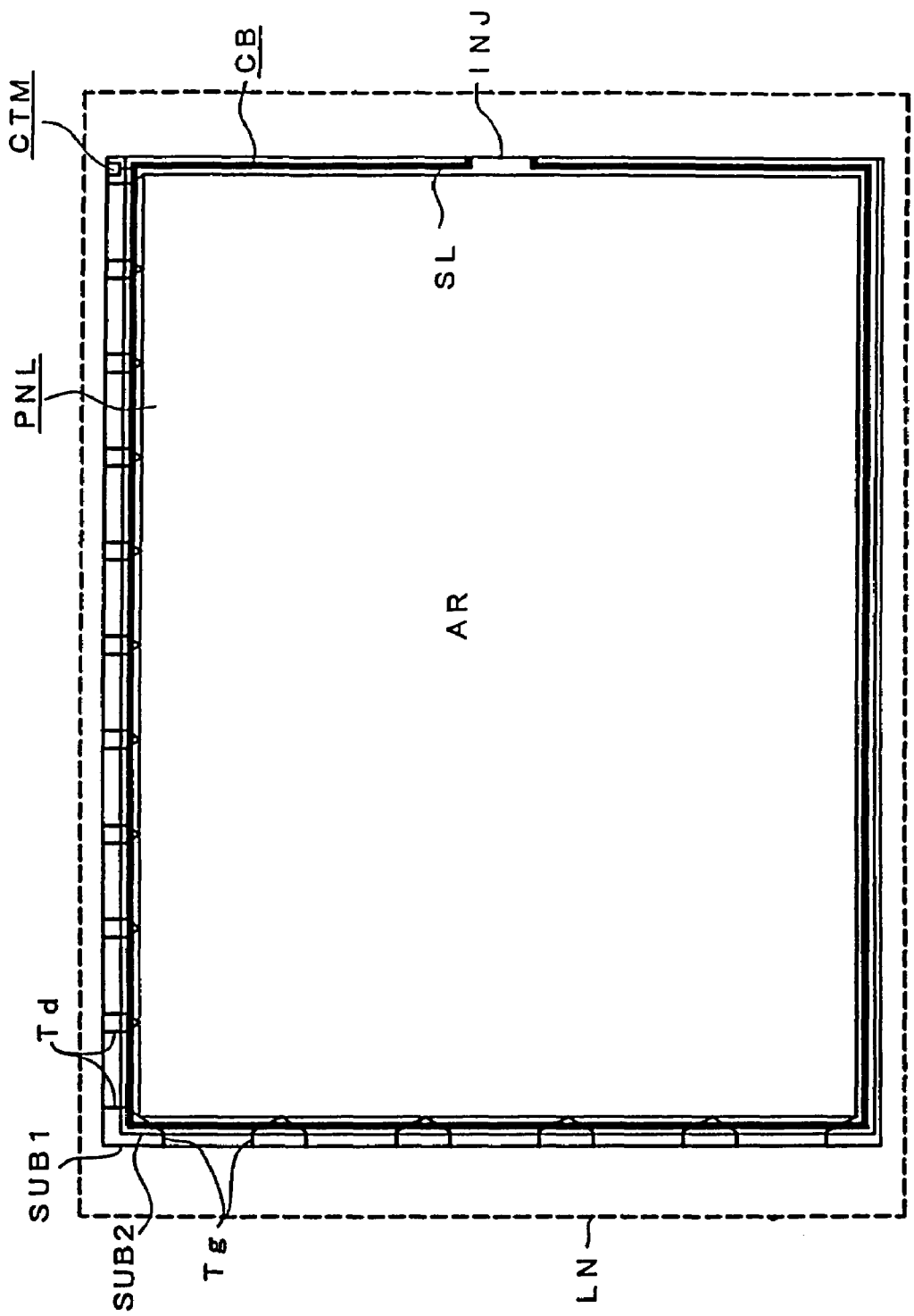
FIG. 5 is a plan view for explaining a structure of a periphery of a matrix of a display panel.
Figure 6:
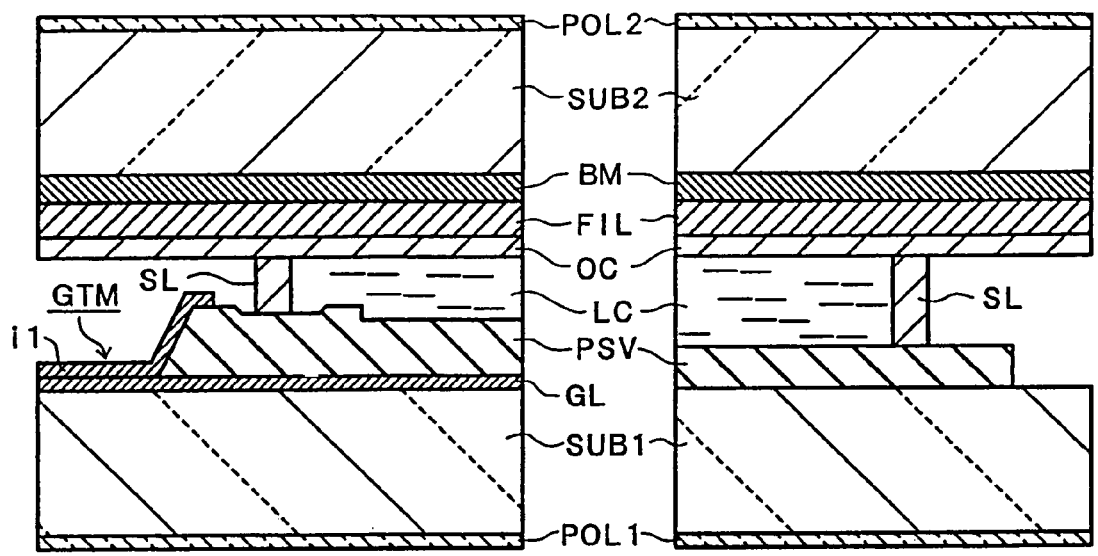
FIG. 6 is a sectional view showing a panel edge part without having a scanning signal terminal on a left side and an external connection terminal on a right side.

FIG. 5 is a figure illustrating a plan of an essential part around the matrix (AR) of the display panel PNL including upper and lower glass substrates SUB1 and SUB2. Meanwhile, FIG. 6 is a figure illustrating on a left side a section of around an external connection terminal GTM to be connected with a scanning circuit and on a right side a section of around a seal part where no external connection terminal exists.

In fabrication of this panel, if small in size, a plurality of devices are simultaneously formed on one glass substrate followed by division in order to improve throughput. If large in size, formation is made on a glass substrate in a size standardized for every product kind followed by reduced in size to each product kind in order to commonly use a fabrication facility. In any of the cases, the glass is cut after ending a required process. FIG. 5 and FIG. 6 illustrate an example of the latter. FIG. 5 and FIG. 6 both depict upper and lower substrate SUB1, SUB2 after cut wherein LN represents the before-cut edges for the both substrates. In any of the cases, in a completed state in areas where external connection terminal groups Tg, Td and terminal CTM (suffixes omitted) exist (upper and left sides in the figure) the upper substrate SUB2 in size is limited inward of the lower substrate SUB1 in a manner exposing them. The terminal groups Tg, Td are named collectively in plurality to a unit of a tape carrier package TCP mounted with an integrated circuit chip CHI for a scanning circuit connection terminal GTM, image signal circuit connection terminal DTM, described later, and their extension wiring. The extension wiring from a matrix of each group to the external connection terminal is made slant as an end is neared. This is due to the requirement to match the terminals DTM, GTM of a display panel PNL to a package TCP arranging pitch and a connection terminal pitch in each package TCP. Also, a counter electrode terminal CTM is a terminal to deliver a counter voltage from an external circuit to the counter electrode CT. The counter voltage signal line CL in the matrix is extended on an opposite side (on the right side in the figure) of the scanning circuit terminal GTM so that each counter voltage signal line is collected on the common bus line CB and connected to the counter electrode terminal CTM.

Between the transparent glass substrate SUB1, SUB2 a seal pattern SL is formed along edges thereof except for a liquid-crystal injection port INJ in a manner sealing a liquid crystal LC. The seal member is formed, for example, of epoxy resin.

The orientation film ORI1, ORI2 layers are each formed at an inner side of the seal pattern SL. The polarizing plates POL1, POL2 are respectively structured on outer surfaces of the lower transparent glass substrate SUB1 and the upper transparent glass substrate SUB2. The liquid crystal LC is filled in a region partitioned by the seal pattern SL between the lower orientation film ORI1 and upper orientation film ORI2 for setting an orientation of liquid crystal molecules. The lower orientation film ORI1 is formed on a protection film PSV1 on a side of the lower transparent glass substrate SUB1.

This liquid crystal display device is assembled by laying various layers separately on the lower transparent glass substrate SUB1 side and the upper transparent glass substrate SUB2 side, forming a seal pattern SL on the substrate SUB2 side, putting together the lower transparent glass substrate SUB1 and the upper transparent glass substrate SUB2, injecting a liquid crystal LC through the opening INJ of the seal member SL, sealing the injection port INJ by epoxy resin or the like, and cutting the upper and lower substrate.

<Gate Terminal>

Figure 7A:
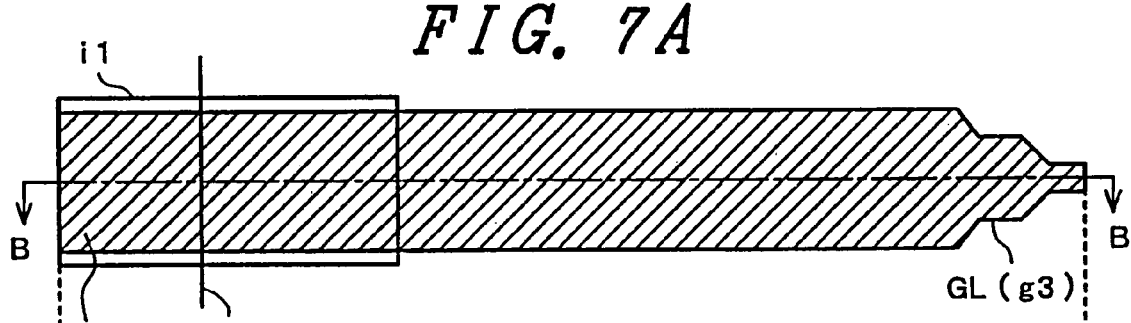
FIG. 7 is a plan-and-sectional view showing a vicinity of a connection point between a gate terminal GTM and a gate interconnection GL.
Figure 7B:
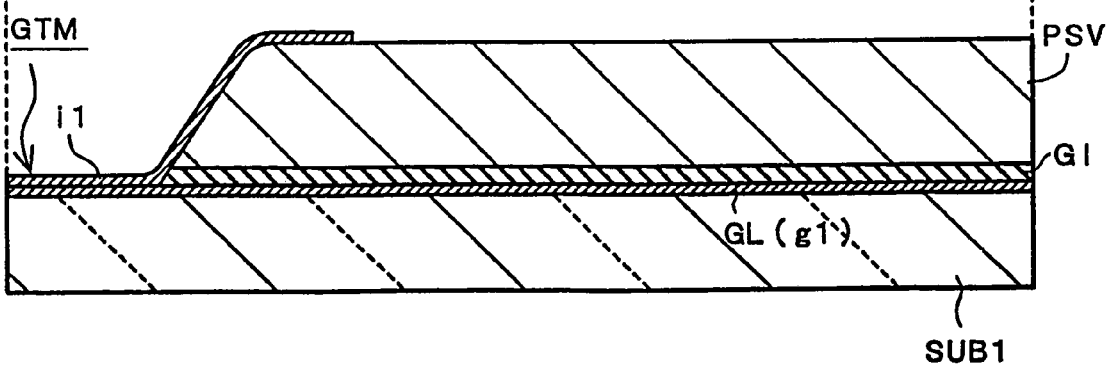

FIG. 7 is a view illustrating a connection structure of from a scanning signal line GL for the display matrix to an external connection terminal GTM thereof, wherein (A) is a plan view and (B) shows a section on cut line B-B in (A). Incidentally, the same figure corresponds to a lower portion of FIG. 5. An oblique wiring part is represented by a straight line form for the sale of convenience.

In the figure, a Cr—Mo layer g3 is hatched for better understanding.

A gate terminal GTM is structured by a Cr—Mo layer g3 and further a transparent conductor layer i1 for protecting a surface thereof and improving the reliability in connection to a TCP (Tape Carrier Package). The transparent conductor layer i1 uses a transparent conductor film ITO.

In the plan view, an insulator film GI and protection film PSV1 are formed on a right side of a boundary line thereof. A terminal GTM positioned at a left end is exposed from them and allowed to have electric contact with an external circuit. Although the figure illustrates one pair of a gate line GL and a gate terminal, actually a plurality of such pairs are vertically arranged to constitute a terminal group Tg (FIG. 5). The gate terminal at its left end in manufacture process extends across a cut region of the substrate and is short-circuited by an interconnection SHg (not shown). This is helpful in preventing against electrostatic breakdown during rubbing the orientation film ORI1 in the manufacture process.

<Drain Terminal DTM>

FIG. 8 is a view illustrating a connection from the image signal line DL to the externally connection terminal DTM thereof, wherein (A) shows a plan and (B) illustrates a section on cut line B-B in (A). Incidentally, the same figure corresponds to an upper right part and its vicinity of FIG. 5. Although the orientation of the figure is changed for the convenience sake, a right end direction corresponds to an upper end of the substrate SUB1.

TSTd is an inspection terminal. This is not connected with an external circuit but widened in width to allow contact by a probe needle or the like. Similarly, a drain terminal DTM is also widened in width in order for connection with an external circuit. The external connection drain terminal DTM is provided in a vertical direction. The drain terminal DTM, as shown in FIG. 5, constitutes for a terminal group Td (suffix omitted) and extends beyond a cut line on the substrate SUB1. In the manufacture process, they are all short-circuited one another by an interconnection SHd (not shown) in order to prevent against electrostatic breakdown. The inspection terminal TSTd is formed on every other one of an image signal line DL, as shown in FIG. 8.

The drain connection terminal DTM is formed of a transparent conductor layer i1 and connected, in an area removed of a protection film PSV1, with an image signal line DL. The transparent conductor film i1 uses a transparent conductor film ITO similarly to that of the gate terminal GTM.

The extension line of from the matrix to the drain terminal DTM is structured with a layer d3 in a same level as the image signal line DL.

<Counter Electrode Terminal CTM>

Figure 9A:
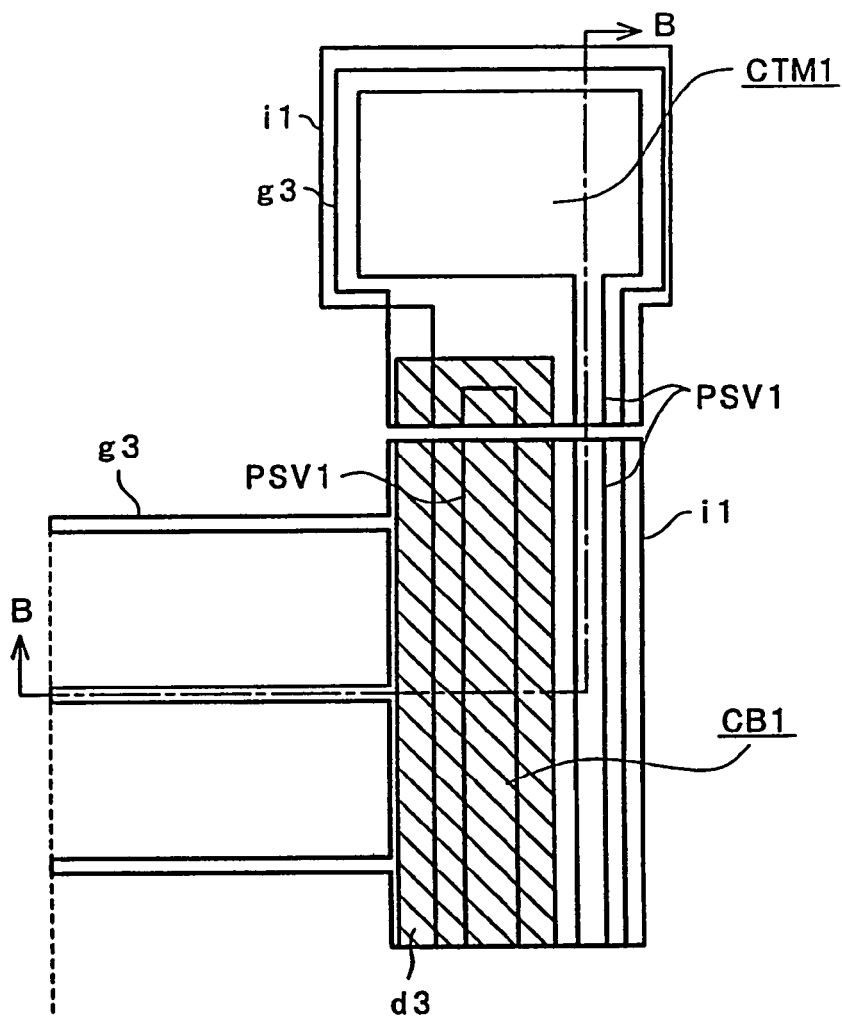
FIGS. 9A and 9B are plan-and-sectional views showing a vicinity of a connection point between a common electrode terminal CTM1, a common bus line CB1 and a common voltage signal line CL.
Figure 9B:
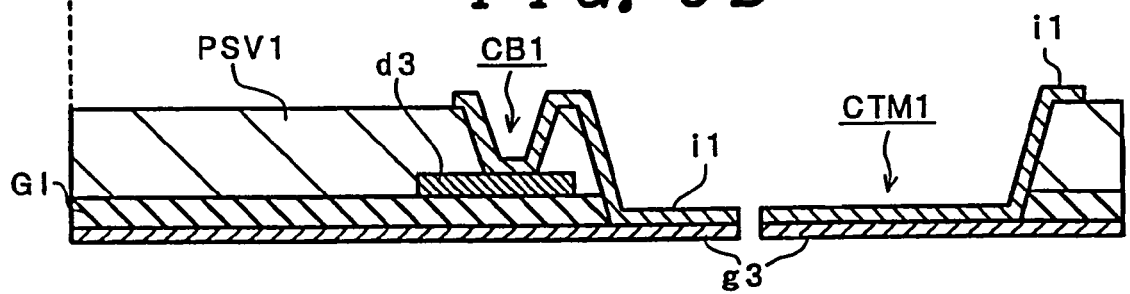

FIGS. 9A and 9B are views illustrating a connection of from a counter voltage signal line CL to an external connection terminal CTM thereof, wherein FIG. 9A shows a plan and FIG. 9B a sectional view on cut line B-B in FIG. 9A. Incidentally, the same figure corresponds to an upper left portion and its vicinity of FIG. 5.

Each counter voltage signal line CL is collected on the common bus line CB1 and extended to the counter electrode terminal CTM. The common bus line CB1 is structured by laying a conductor layer d3 on a conductor layer g3 and electrically connecting them by a transparent conductor layer i1. This is to reduce the resistance on the common bus line CB and sufficiently supply a counter voltage from an external circuit to each counter voltage signal line CL. The present structure is characterized in that the resistance on the common bus line can be reduced without especially imposing new load on the conductor layer.

The counter electrode terminal CTM is structured having a transparent conductor layer i1 laid on the conductor layer g3. This transparent conductor film i1 uses a transparent conductor film ITO similarly to that of other terminals. The transparent conductor layer i1 protects a surface. The conductor layer g3 is covered by the transparent conductor layer i1 having endurance to prevent electrolytic corrosion, etc. Also, the connection of the transparent conductor layer i1 to the conductive layer g3 and conductor layer d3 is made by providing conduction of a through-hole formed in the protection film PSV1 and insulator film GI.

Figure 10A:
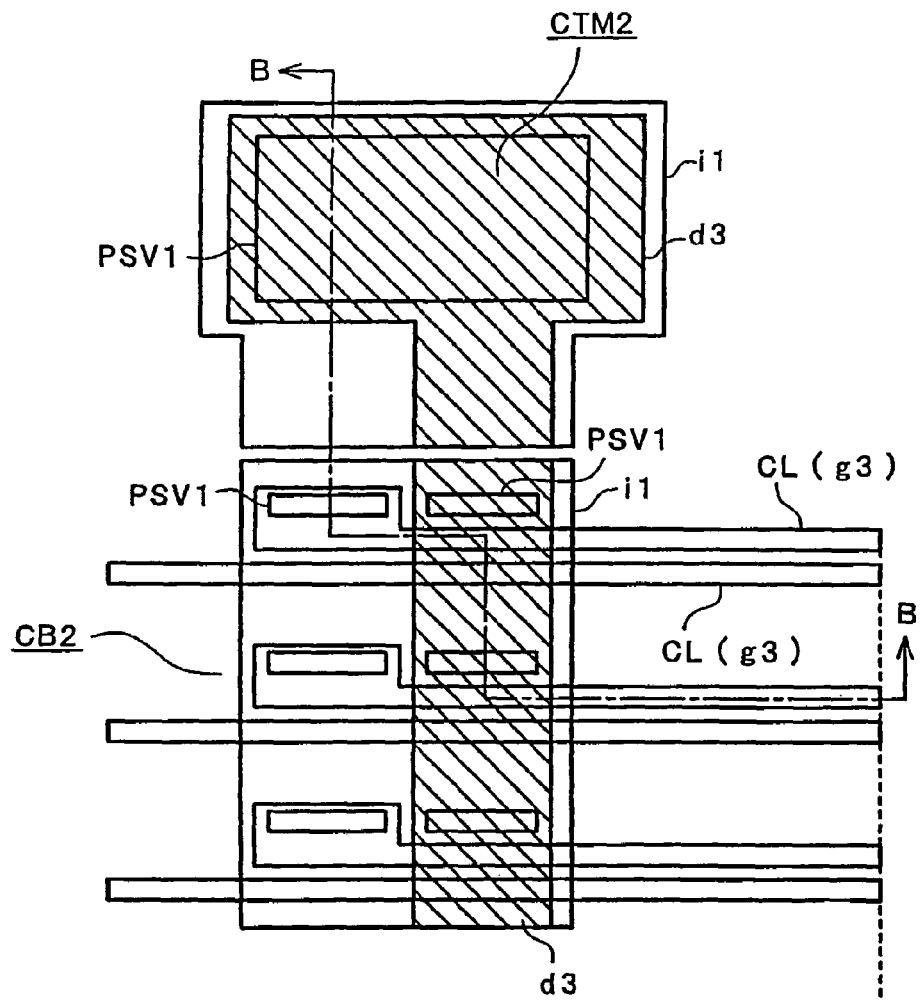
FIGS. 10A and 10B are plan-and-sectional views showing a vicinity of a connection point between a common electrode terminal CTM2, a common bus line CB2 and a common voltage signal line CL.
Figure 10B:
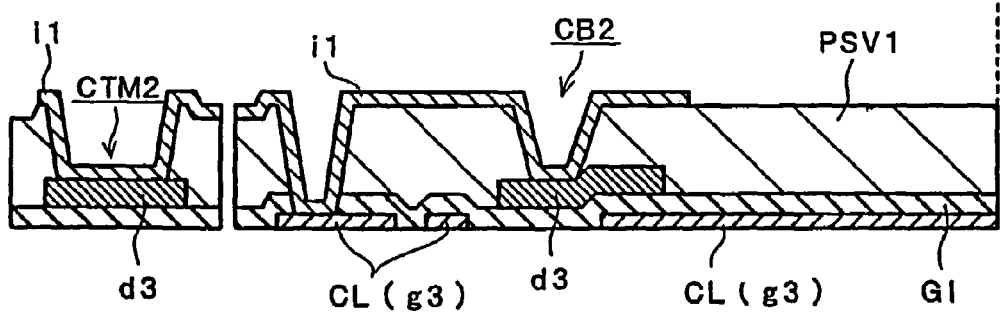

Meanwhile, FIGS. 10A and 10B are views illustrating a connection of from the other end of the counter voltage signal line CL to an external connection terminal CTM2 thereof, wherein FIG. 10A shows a plan and FIG. 10B a section on cut line B-B in FIG. 10A. Incidentally, the same figure corresponds to the upper right portion and its vicinity of FIG. 5. Here, on a common bus line CB2 each counter voltage signal line CL at the other end (on a gate terminal GTM side) is collected and extended to the counter electrode terminal CTM2. The different point from the common bus line CB1 is formation with a conductor layer d3 and transparent conductor layer i1 so as to be insulated from the scanning signal line GL. Also, insulation is provided by an insulator film GI from the scanning signal line GL.

<Display Device Overall Equivalent Circuit>

Figure 11:
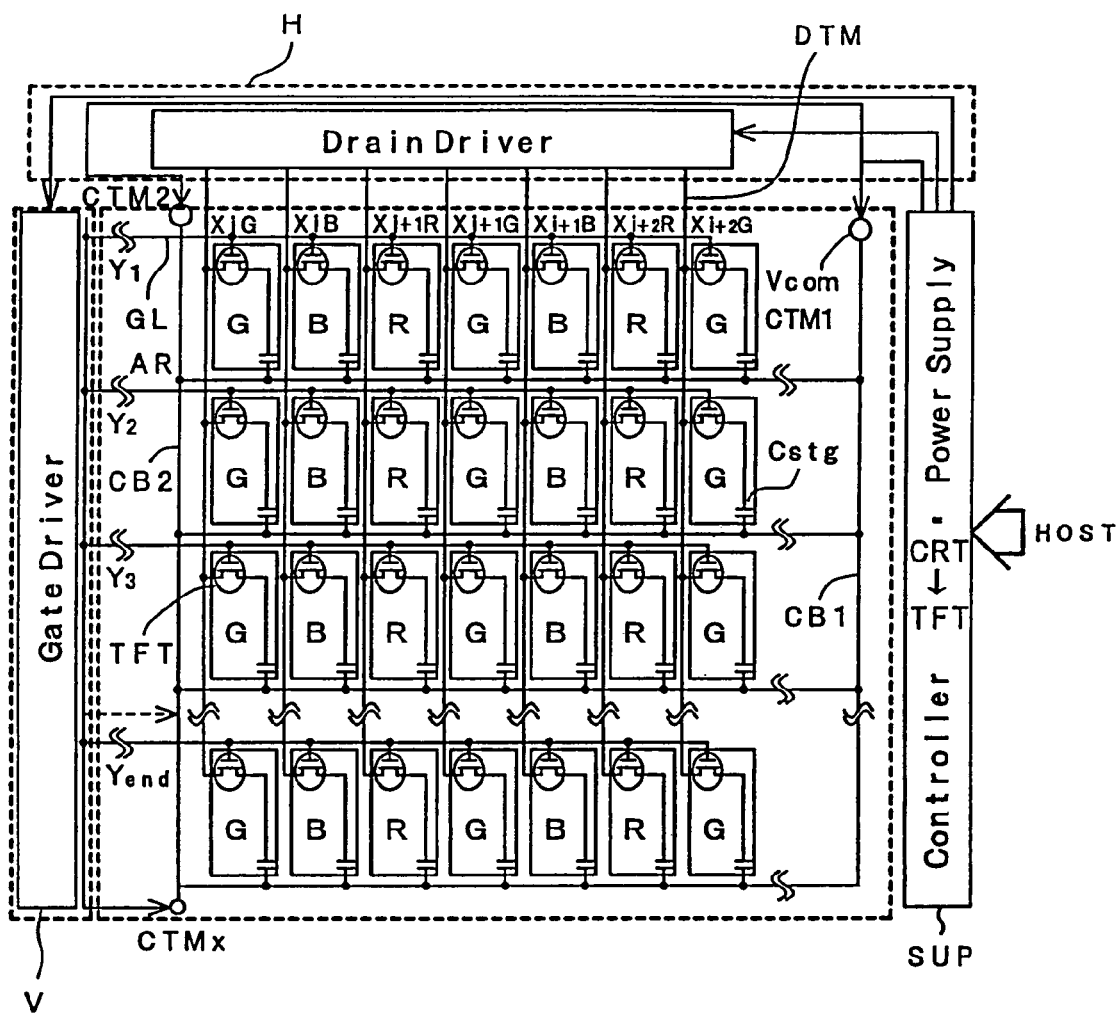
FIG. 11 is a circuit diagram including a matrix part and its periphery of the active-matrix color liquid crystal display device of the invention.
Figure 12A:
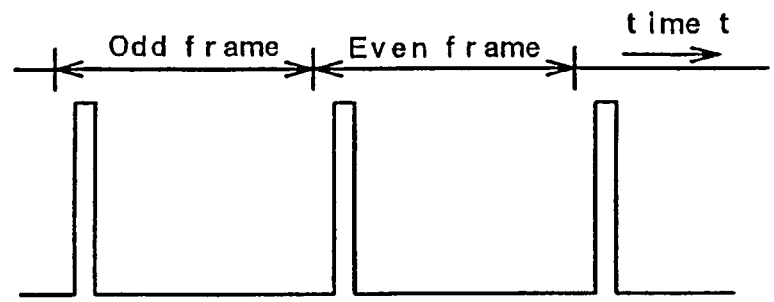
FIGS. 12A through 12F are diagrams showing a drive waveform to the active-matrix color liquid crystal display device of the invention.
Figure 12B:
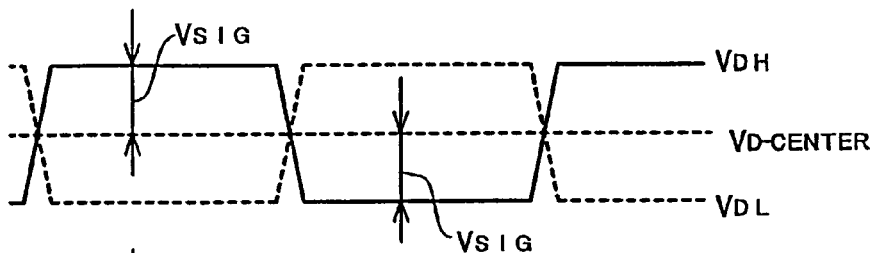
Figure 12C:
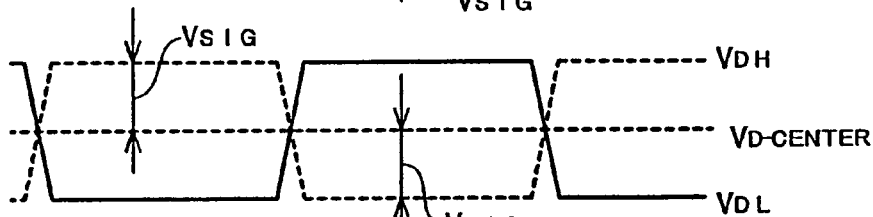
Figure 12D:
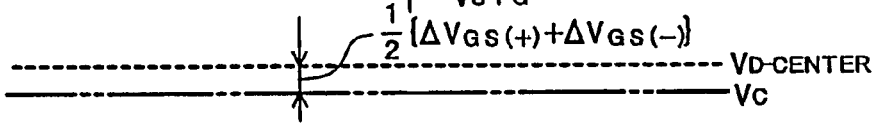
Figure 12E:
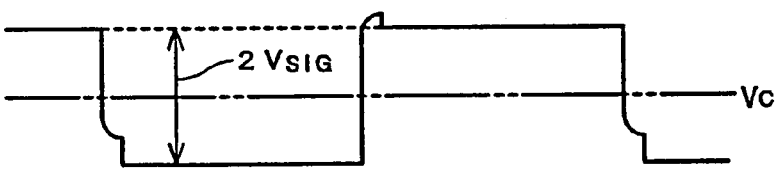
Figure 12F:
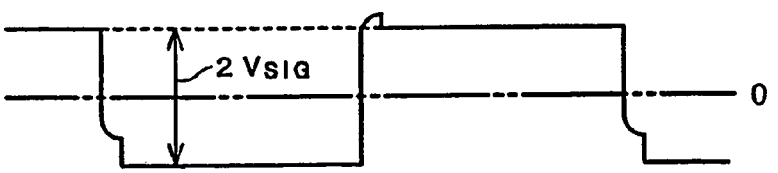

FIG. 11 illustrates a connection diagram of a display-matrix equivalent circuit and its peripheral circuits. The same figure as a circuit diagram is depicted corresponding to an actual geometric arrangement. AR is a matrix array having a plurality of pixels arranged in a two-dimensional form.

In the figure, X means an image signal line DL and suffixes G, B and R are added corresponding to green, blue and red pixels. Y means a scanning signal line GL having a suffix 1, 2, 3, . . . , end according to a sequence in timing of scanning.

Scanning signal lines Y (suffix omitted) are connected to a vertical scanning circuit V, image signal lines X (suffix omitted) are connected to an image signal drive circuit H.

SUP is a circuit including a power circuit to obtain a plurality of stabilized power sources voltage-divided from one power supply and circuit to exchange information for CRT (cathode ray tube) from host (host central processing unit) to information for TFT liquid crystal display device.

<Driving Method>

FIGS. 12A through 12F illustrate drive waveforms for the liquid crystal display device of the present embodiment. A counter voltage Vch is given a constant voltage. A scanning signal Vg is on in level every one scanning period and off in level in other timing. An image signal voltage is double in amplitude of a voltage to be applied to the liquid crystal layer and inverted in positive and negative pole every one frame, being applied in a manner conveyed to one pixel. Here, the image signal voltage Vd is inverted in polarity on every one column and also inverted in polarity on every other row. This provides a structure having polarity-inverted pixels adjacent in the upper, lower, left and right, wherein flicker, crosstalk (smear) is not liable to occur. Also, a counter voltage Vc is set at a voltage lowered by a given amount from a center voltage of polarity inversion in the image signal voltage. This is to correct a field-through voltage to be occurred upon turning from on to off in the thin film transistor element, and to apply an alternating current with a reduced direct current component to the liquid crystal (because the liquid crystal is increased in residual image, deterioration, etc. if applied with a direct current).

Besides, the counter voltage, if made alternating, can be reduced in maximum amplitude in the image signal voltage, making it possible to use an image signal drive circuit (signal side driver) with a low withstand voltage.

<Manufacturing Method>

Next, a method of manufacturing on a substrate SUB1 side for a liquid crystal display device described above will be explained with reference to FIG. 13 to FIG. 15. Note that in the figure the characters in the center are simplified process names and a process flow as viewed in a thin film transistor TFT part shown in FIG. 3 in the left and a sectional form in the vicinity of the gate terminal shown in FIG. 7 in the right. Excepting a process B and process D, process A to process F are divided corresponding to a photolithography process. Each process sectional view depicts a stage that forming after a photolithography process is ended and photoresist is removed away. Incidentally, the photolithography process in this explanation refers to a series of operations of from photoresist application through selective exposure using a mask to development of same, hence repeated explanation being omitted.

Hereunder, explanations will be made according to a divided process.

Figure 13:
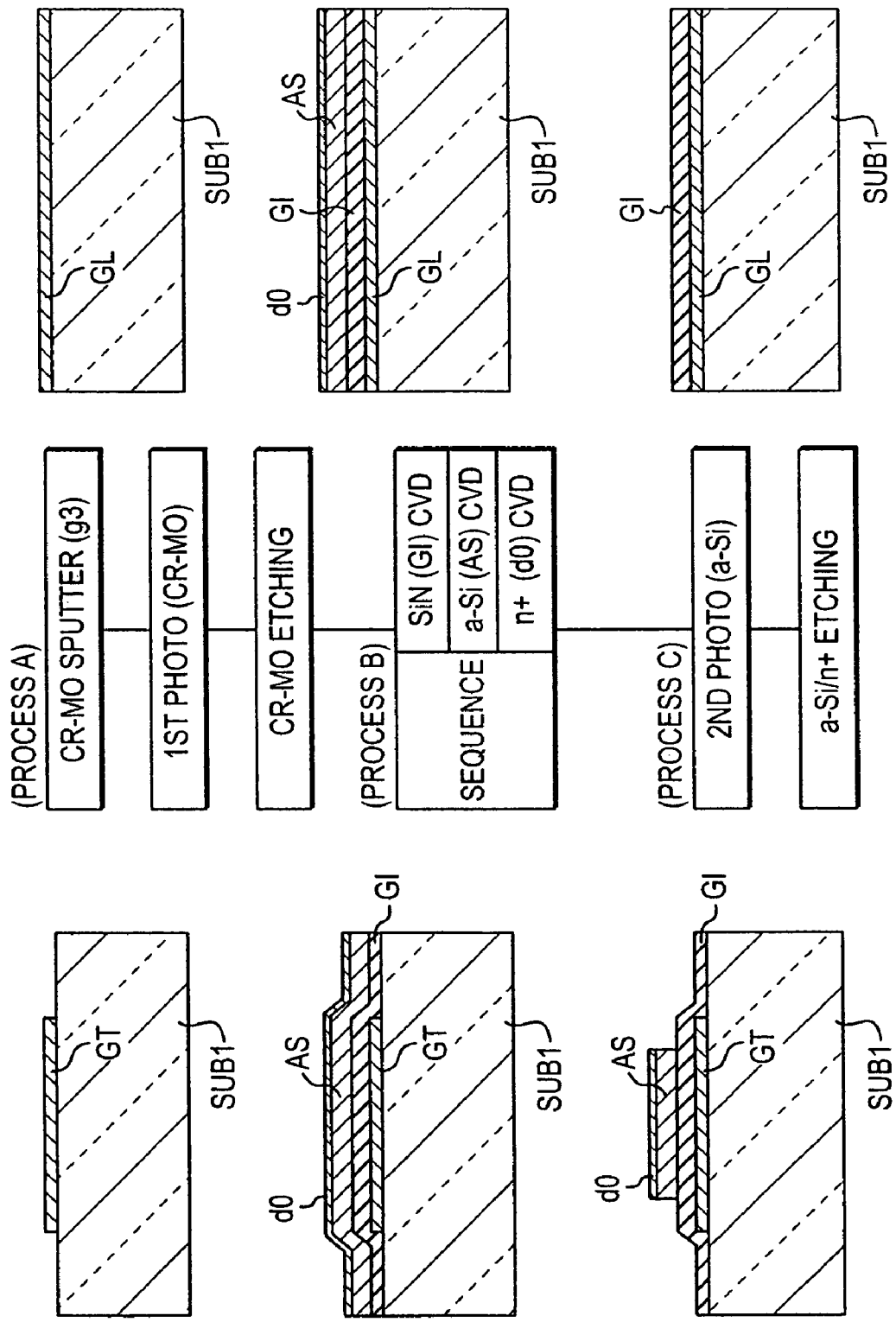
FIG. 13 is a flowchart in section of a pixel part and gate terminal part showing manufacturing processes A-C on a substrate SUB1 side.

Process A, FIG. 13

A conductor film g3 of Cr—Mo or the like is provided by sputtering to a film thickness of 2000 angstroms over a lower transparent glass substrate SUB1 of AN635-glass (product name).

After photolithography, the conductor film g3 is selectively etched using cerium nitrate ammonia. This forms a gate electrode GT, a scanning signal line GL, a counter voltage signal line CL, a counter electrode CT, a gate terminal GTM, a first conductor layer of a common bus line CB1, a first conductor layer in the counter electrode terminal CTM1, a bus line SHg for connecting the gate terminal GTM (not shown).

Process B, FIG. 13

Introducing an ammonia gas, a silane gas and a nitrogen gas into a plasma CVD apparatus to provide a Si nitride film with a thickness of 3500 angstroms. Introducing a silane gas and a hydrogen gas into the plasma CVD apparatus to provide an i-type amorphous Si film with a film thickness of 1200 angstroms. Then, a hydrogen gas and a phosphine gas are introduced in the plasma CVD apparatus to provide an N(+) type amorphous Si film with a film thickness of 300 angstroms.

Process C, FIG. 13

After a photolithography process, SF6 and CC14 are used as dry etching gases to preferentially etch the N(+) type amorphous Si film and i-type amorphous Si film, thereby forming an i-type semiconductor layer AS island.

Figure 14:
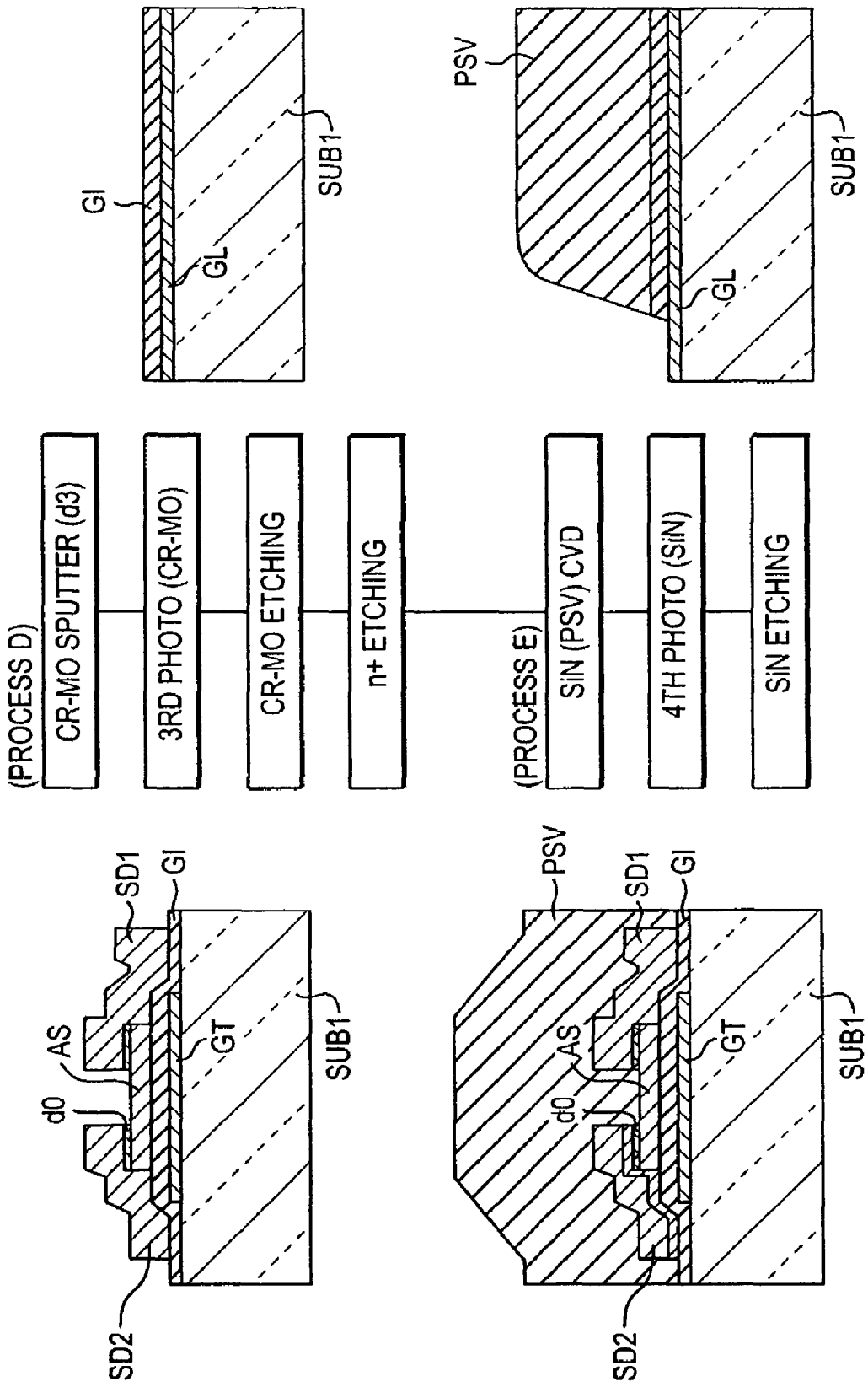
FIG. 14 is a flowchart in section of a pixel part and gate terminal part showing manufacturing processes D-F on the substrate SUB1 side.

Process D, FIG. 14

A Cr conductor film d3 with a film thickness of 300 angstroms is provided by sputtering. After a photolithography process, the conductor film d3 is etched with a solution similar to that of the process A, thus forming an image signal line DL, a source electrode SD1, a pixel electrode PX, a drain electrode SD2, a first conductor layer in a common bus line CB2 and a bus line SHd short-circuiting the drain terminal DTM (not shown). Next, CC14 and SF6 are introduced in a dry etching apparatus to etch the N(+) type amorphous Si film thereby selectively remove the N(+) type semiconductor layer d0 from between the source and the drain. The conductor film d3 is patterned with a mask pattern, the N(+) type semiconductor layer d0 is removed using the conductor film d3 as a mask. That is, the N(+) type semiconductor layer d0 left on the i-type semiconductor layer AS is removed at areas other than the conductor film d1 and the conductor film d2 in a self-aligned manner. At this time, the N(+) type semiconductor layer d0 is etched such that it in the entire thickness is completely etched. Accordingly, the i-type semiconductor layer AS in its surface is somewhat etched, the degree of which may be controlled by etching time.

Process E, FIG. 14

An ammonia gas, a silane gas and nitrogen gas are introduced in the plasma CVD apparatus to provide a Si nitride film in a film thickness of 0.4 μm. After a photolithography process, SF6 is used as a dry etch gas to preferentially etch the Si nitride film thereby patterning the protection film PSV1 and insulator film GI. Here, the protection film PSV1 and the insulator film GI are patterned by a same photo-mask and formed at a same time.

Figure 15:
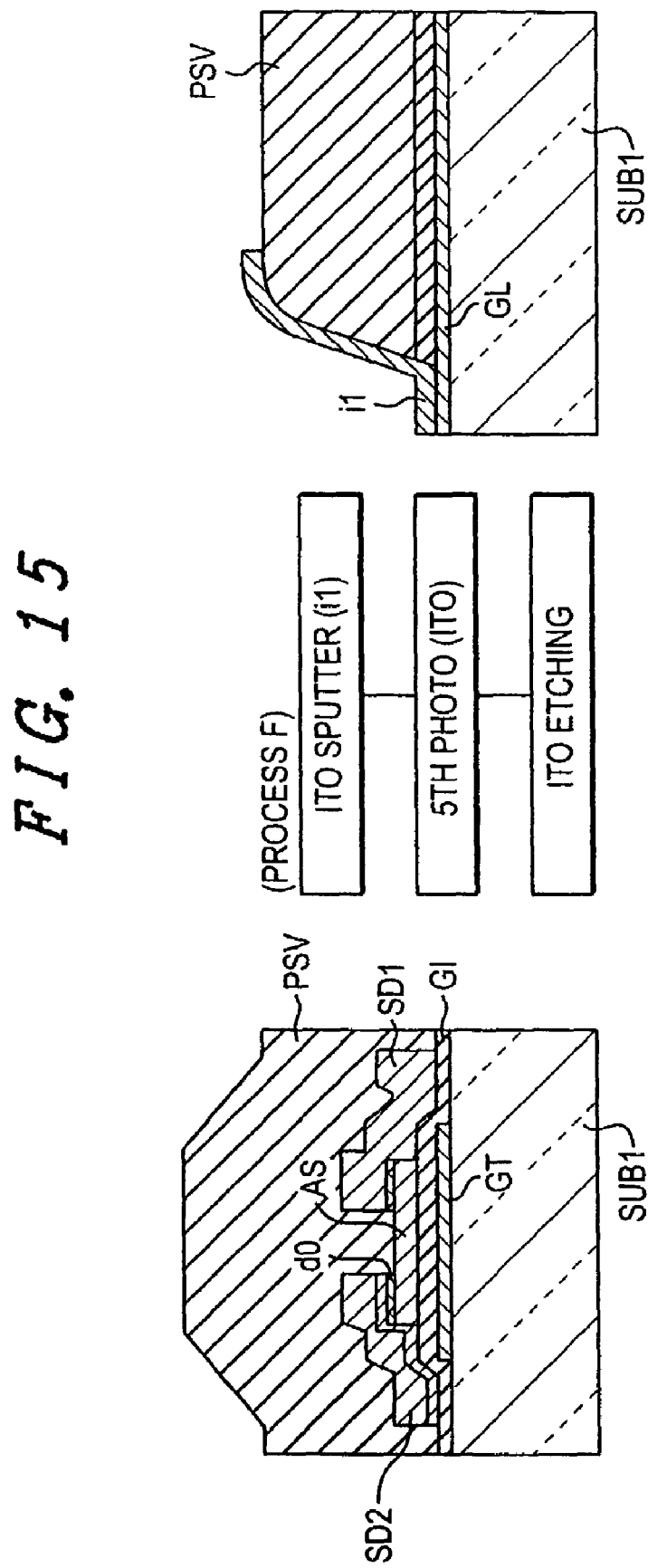
FIG. 15 is a flowchart in section of a pixel part and gate terminal part showing manufacturing process G on the substrate SUB1 side.

Process F, FIG. 15,

A transparent conductor film i1 of an ITO film is provided by sputtering in a film thickness of 1400 angstroms. After a photolithography process, the transparent conductor film i1 is preferentially etched using an acid mixture solution of a hydrochloric acid and a nitric acid as an etch solution, thereby forming an uppermost layer for a gate terminal GTM, a drain terminal DTM and second conductor layers for counter electrode terminals CTM1 and CTM2.

<Display Panel PNL and Drive Circuit Board PCB1>

Figure 16:
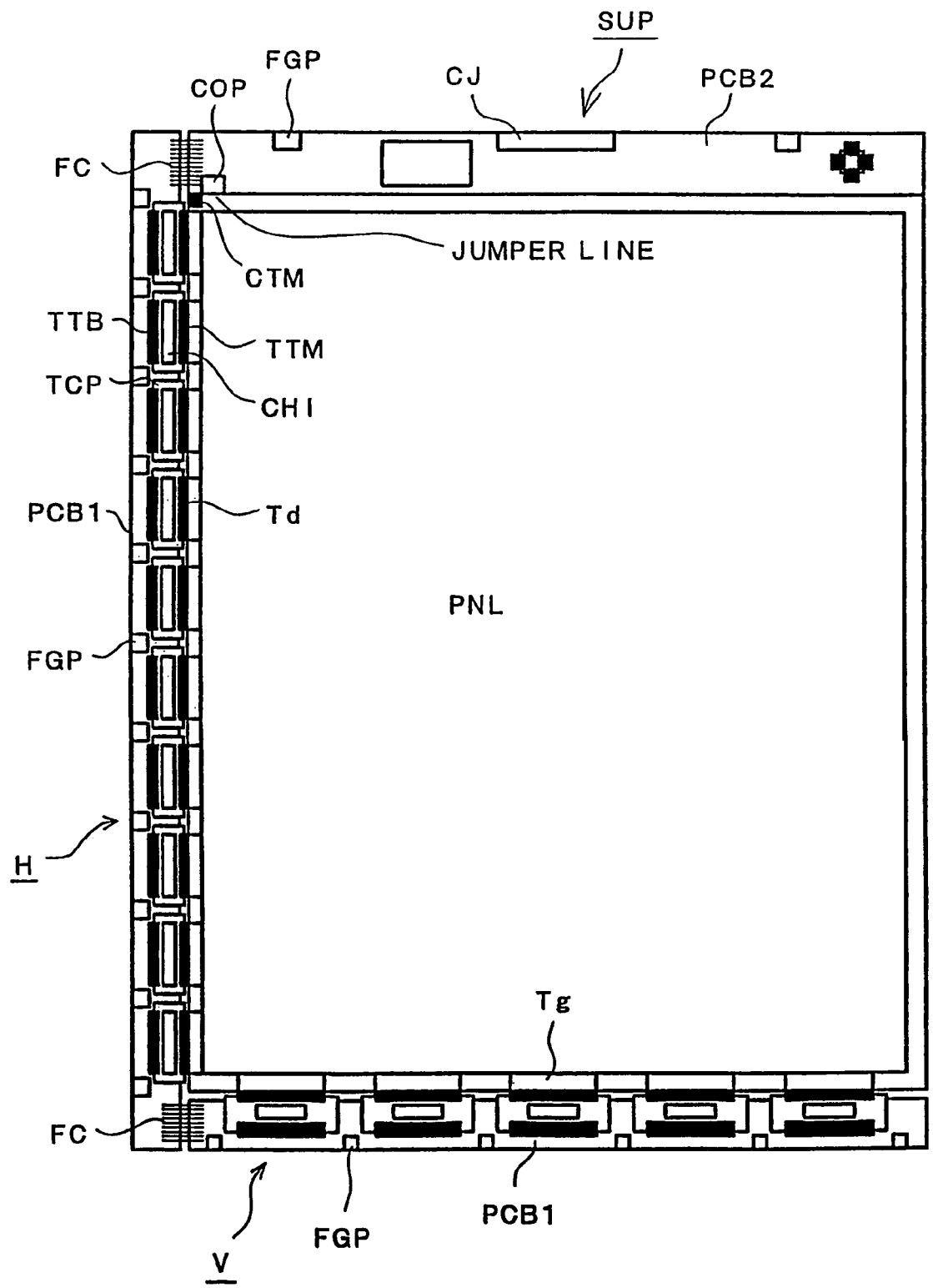
FIG. 16 is a top view showing a state that a liquid crystal display panel is mounted with peripheral drive circuits.

FIG. 16 is a top view illustrating a state that the display panel PNL shown in FIG. 5, etc. is connected with an image signal drive circuit H and a vertical scanning circuit V.

CHI is a drive IC chip for driving the display panel PNL (lower five are drive IC chips on a vertical scanning circuit side, and left ten in each are a drive IC chip on a image signal drive circuit side). TCP is a tape carrier package having a driving IC chip CHI mounted thereon by a tape automated bonding (TAB) method. PCB1 is a driving circuit board mounted with the TCP or capacitors, etc. and divided into two for an image signal drive circuit and a scanning signal drive circuit. FGP is a frame ground pad and soldered with a spring-formed piece provided by cut on a shield case SHD. FC is a flat cable for electrical connection between the driving circuit board PCB1 on a lower side and the driving circuit board PCB1 on a left side. The flat cable FC uses one having a plurality of lead wires (a phosphor bronze material plated with Sn) held sandwiched by a stripe formed polyethylene layer and polyvinylalchol layer as shown in the figure.

<Liquid Crystal Display Module Structure>

Figure 17:
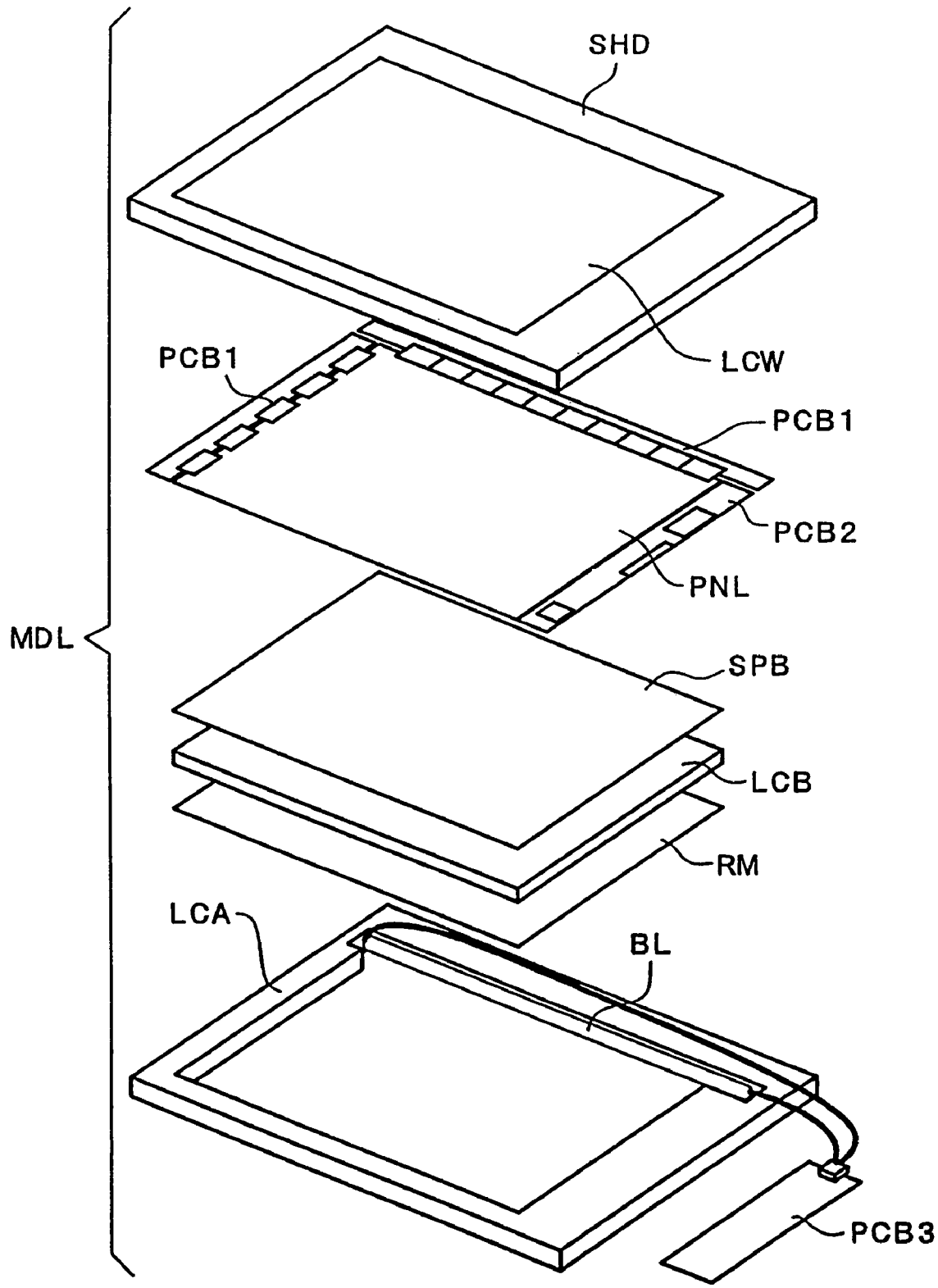
FIG. 17 is an exploded perspective view of a liquid crystal display module.

FIG. 17 is an exploded perspective view illustrating component parts for a liquid crystal display module MDL.

SHD is a frame-formed shield case (metal frame) made by a metal plate, LCW is a display window, PNL is a liquid crystal display panel, SPB is a light diffuser plate, LCB is a light conductor member, RM is a reflector plate, BL is a backlight fluorescent tube, and LCA is a backlight case. The members are stacked in a relationship of vertical arrangement as shown in the figure thereby assembling a module MDL.

The module MDL in its entirety is fixed by a pawl and hook provided on the shield case SHD.

The backlight case LCA is made in a form to accommodate therein the backlight fluorescent tube BL, the light diffuser plate SPB light diffuser plate, the light conductor member LCB and the reflector plate RM. The light of the backlight fluorescent tube BL arranged on a side face of the light conductor member LCB is turned by the light conductor member LCB, reflector plate RM and light diffuser plate SPB into homogeneous backlight on a display surface, being emitted to a liquid crystal display panel PNL side.

The backlight fluorescent tube BL is connected with an inverter circuit board PCB3 serving as a power source for the backlight fluorescent tube BL.

<Characteristic of the Present Embodiment>

Figure 21:
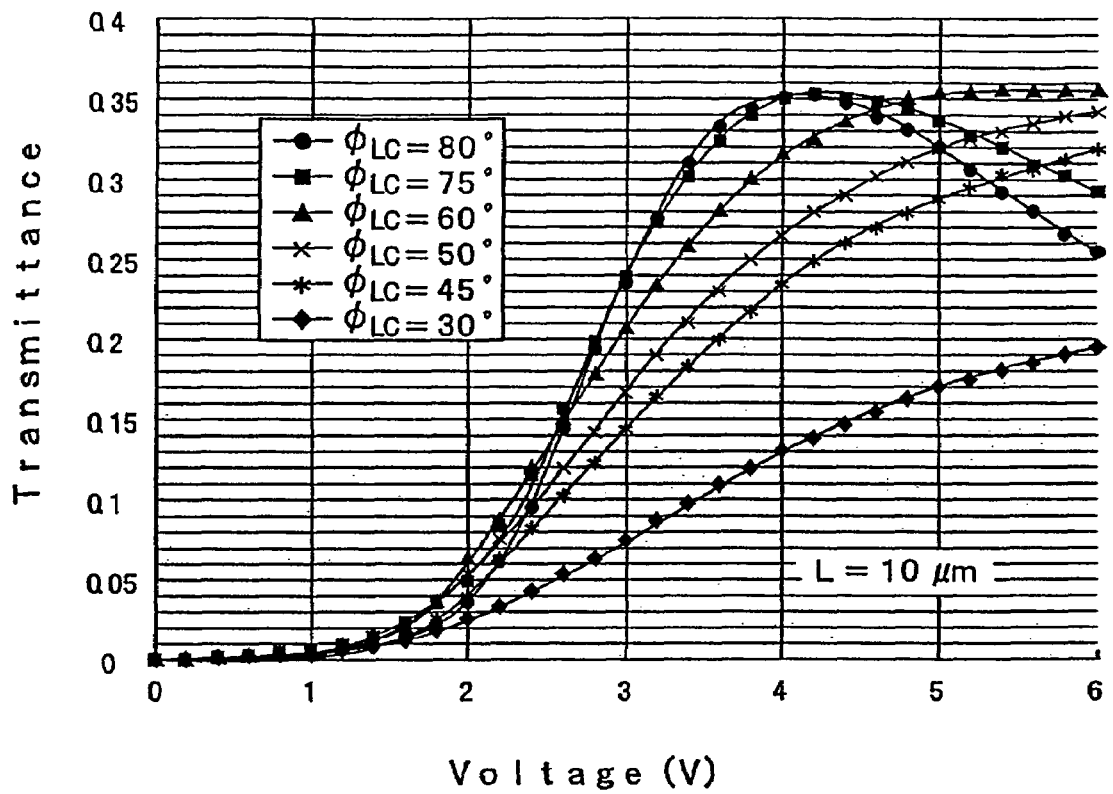
FIG. 21 is a figure showing a voltage vs. luminance characteristic of the present invention.

FIG. 21 is a graph showing an electro-optical characteristic (voltage vs. luminance characteristic) of a liquid crystal display device constructed as above.

Here, this graph includes illustrations of a voltage vs. luminance characteristic A only in the region A and a voltage vs. luminance characteristic B only in the region B, and the voltage vs. luminance characteristic of the liquid crystal display apparatus according to the present embodiment is shown as a combination of them, i.e. A+B in the figure.

Incidentally, the voltage vs. luminance characteristic B in the region B is for a case as shown in FIG. 1 that the spacing between the pixel electrode PX and the counter electrode in the region B is narrowed than that in the region A. By varying the spacing between the pixel electrode PX and the counter electrode in the region B, a characteristic shifted in a voltage direction is obtained (narrowing the spacing between the electrodes results in shift leftward of the graph).

Consequently, in order to delicately change the voltage vs. luminance characteristic A in the region A and provide a desired characteristic, it is preferred to control the spacing between the pixel electrode PX and the counter electrode in the region B.

As apparent from the graph, the voltage vs. luminance characteristic A only in the region A has a range that luminance changes steeply with respect to voltage. However, this range can be made moderate by providing the region B having a voltage vs. luminance characteristic B.

In this embodiment, the range that luminance steeply changes with respect to voltage exists conspicuously in the vicinity of a transmissivity of 10 in a darker middle tone range (transmissivity 0-20%), in which range moderateness is given. In this case, it is revealed that the region B is effectively provided for a case in a range of 0.05 to 0.3 times the area of the region A.

This can suppress the variation in luminance with respect to the variation in dimension of spacing between the pixel electrode PX and the counter electrode CT to approximately 50% than the conventional, thus improving the quality of display.

As apparent from the same figure graph, the effect can be provided without the increase of a maximum drive voltage Vmax to between the pixel electrode PX and the counter voltage CT.

That is, from considering the object of merely providing a moderate curve to the voltage vs. luminance characteristic in the pixel region, it is satisfactory to decrease an angle .PHI. LC given between an electric field direction and an initial alignment direction in each pixel region (in other words, the region B is given for the pixel region in its entirety).

However, this requires great increase in the voltage (Vmax) between the pixel electrode PX and the counter electrode CT for obtaining the maximum transmissivity of pixel, resulting in improperness as a liquid crystal display device with a merit of low power consumption.

From this viewpoint, by providing an angle .PHI. LC of 75 degrees or greater (.PHI. LC.gtoreq.75 degrees) defining between an electric field direction and an initial alignment direction in the region A as shown in FIG. 20, the maximum drive voltage Vmax is suppressed from increasing. Furthermore, in the region B, by providing a range of an angle .PHI. LC of between 30 and 75 degrees defining between the electric field direction and the initial alignment direction (preferably between 45 and 60 degrees), the rise in luminance can be put to a lowermost voltage.

Meanwhile, the region A is to suppress from rising the voltage applied between the pixel electrode PX and the counter electrode CT described above. In this respect, it is preferred to grasp the region A as a principal region rather than the region B. In other words, it is preferred to provide in each region a larger area to the region A than the region B and a moderate curve to the voltage vs. luminance characteristic in each pixel region, with a state given that the application voltage to between the pixel electrode PX and the counter electrode CT is nearly same as that of the conventional case.

However, in the invention the area ratio of the region A and region B is not especially limitative. There is no technical reason of necessarily providing the application voltage to between the pixel electrode PX and the counter electrode CT to a predetermined value or lower, because it can be properly determined from a relationship of between an obtainable application voltage and moderate characteristic curve.

In brief, the region B is satisfactorily provided having an electric field direction and initial orientation direction different in the angle relative to the region A set in angle defined between an electric field direction and an initial alignment direction in an area between the pixel electrode PX and the counter electrode CT. This is because the provision of the region B gives the voltage vs. luminance characteristic with a more moderate curve than in the pixel region only in the region A thereby reducing the variation in luminance due to the variation in electrode-to-electrode spacing.

The effect of the invention is similarly obtainable by means for regulating an initial alignment direction of liquid crystal, i.e. in a case of giving the improvement described above only to the orientation film ORI.

The invention has a region A and region B in a pixel region, and lies in that in the region B the angle defined between an electric field direction and an initial alignment direction is given different from that in the region A. In the case that an electric field direction is provided constant in the region A and region B of the pixel region, the initial alignment direction in the region B may be given different from that in the region A.

Also, from a similar reason, the electric field direction and initial alignment direction in the region B may be respectively made different from those in region A with a result that the angle defined between the electric field direction and initial alignment direction in the region B be different from that in the region A. This of course provides a similar effect.

Incidentally, the above embodiment was explained from a viewpoint of preventing luminance variation due to spacing variation between the counter electrode CT and the pixel electrode PX within each pixel.

However, the invention is also applicable in a viewpoint that, where the voltage vs. luminance characteristic in the pixel region in part is steep, that point is made moderate to improve the quality of display. Thus, the invention is not necessarily premised on a presence of variation in the spacing of between the counter electrode CT and the pixel electrode PX.

Meanwhile, there is so-called a middle tone range (range having an optical transmissivity of 0-20%) as one point where the pixel-region voltage vs. luminance characteristic assumes steep. By applying the invention to this point, it is possible to smoothen a luminance change in the middle tone range where recognition is easy by the human eye.

EMBODIMENT 2

Figure 25:
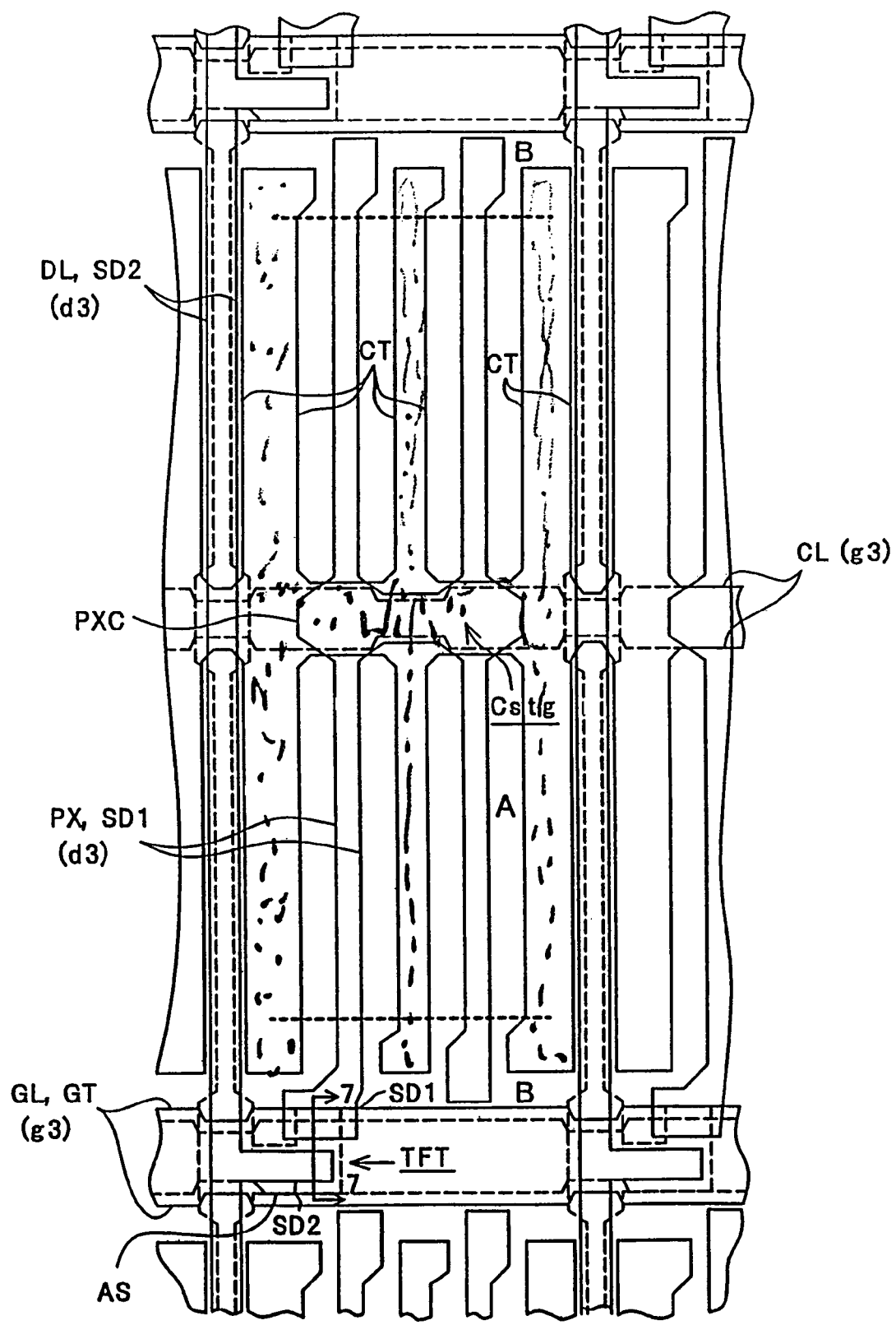
FIG. 25 is a structural view showing another embodiment according to the invention.

FIG. 25 is a structural view illustrating another embodiment of a liquid crystal display device according to the invention. Incidentally, a sectional view on line 7-7 in the figure is similar to FIG. 3.

This figure shows a plan structure of a matrix (pixel part). The parts other than this are similar to the case of Embodiment 1.

The present embodiment has a difference in that a counter voltage signal line CL is formed extending in almost a center of each pixel region in a manner separating same and the spacing between the pixel electrode PX and the counter electrode CT is varied in areas corresponding to the region A and region B.

In FIG. 25, scanning signal lines GL extending right-and-left are vertically formed on a main surface of a transparent substrate SUB1. Between the scanning signal lines GL a counter voltage signal line CL is formed extending also in the right-and-left direction.

In this case, the scanning signal line GL and the counter voltage signal line CL are structured, for example, of a same material, which are formed simultaneously.

The pixel region is constituted by an area encompassed by the scanning signal lines GL and adjacent image signal lines DL, hereafter stated. Due to this, the counter voltage signal line CL is formed almost in the center of the pixel region.

This structure is to separate the counter voltage signal line CL from the scanning signal line GL and thereby avoid them from being formed in contact during manufacture.

Here, in this embodiment the upper and lower area of the pixel region, i.e. the area adjacent to the each scanning signal line GL, is structured as a region B with the remaining area as a region A. The structural difference in between these areas will be apparent hereafter.

Further, the counter voltage signal line CL is formed integral with a counter electrode CT extending within each pixel region.

The counter electrode CT vertically extends sandwiching the counter voltage signal line CL. Three counter electrodes CT in total are structured, i.e. one is adjacent to one image signal line DL, one adjacent to the other image signal line DL, and one between them.

Incidentally, this embodiment has an especial shape in an area that each counter electrode CT is adjacent to the scanning signal line GL (region B in the pixel region).

That is, of the three extending upward beyond the counter voltage signal line CL, the left two for example have portions protruding right. This allows to form an electrode spacing to the hereafter-referred pixel electrode PX to be positioned right smaller than that of the region A.

Similarly, of the three extending downward beyond the counter voltage signal line CL, the right two for example have portions protruding left. This allows to form an electrode spacing to the hereafter-referred pixel electrode PX to be positioned left smaller than that of the region A.

On the transparent substrate SUB1 thus formed, an insulator film GI (see FIG. 3) is formed covering the scanning signal lines GL and the counter voltage signal lines CL (counter electrodes CT).

This insulator film GI serves as a gate insulation film for the hereafter-referred image signal line DL and for the scanning signal line GL and counter voltage signal line CT, a gate insulation film for an area to form a thin film transistor TFT, and a dielectric film for an area to form a storage capacitor Cstg.

On a surface of the insulator film GI, amorphous silicon AS is formed in an area to form a thin film transistor TFT. The amorphous silicon AS is formed superposed on the scanning signal line GL in an area close to the image signal line DL.

Due to this, the scanning signal line GL in part is structured serving also as a gate electrode GT of a thin film transistor TFT.

Also, on a surface of the insulator film GI is formed an image signal line DL extending in the vertical direction and juxtaposed with respect to the right-and-left direction.

This image signal line DL is provided with a drain electrode SD2 formed extending to one part of a surface of the amorphous silicon AS for the thin film transistor TFT.

Furthermore, on the surface of the insulator film GI in the pixel region, a pixel electrode PX is formed of a same material as and simultaneously with the image signal line DL.

This pixel electrode PX is formed in a manner running between the counter electrodes CT.

That is, the pixel electrode PX has a common connection point PXC formed superposed on part of the counter voltage signal line CT. Totally two pixel electrodes PX are structured such that one is in a manner running between the two counter electrodes CT arranged adjacent on a left side in the figure and one is in a manner running between the two counter electrodes CT arranged adjacent on a right side in the figure.

The pixel electrode PX thus structured is formed almost in an 'H' shape including the common connection point, one of ends of which extends to the area of forming a thin film transistor TFT and structures a source electrode SD1 for the thin film transistor TFT.

Here, this embodiment has an especial form in an area where each pixel electrode PX nears the scanning signal line GL (region B in the pixel region).

That is, the two extending upward beyond the common connection points PXC have right-protruding portions. This allows to form an electrode spacing to the counter electrode CT to be positioned right smaller than that in the region A.

Similarly, of the two extending downward beyond the common connection points PXC, the right one has a left-protruding portion. This allows to form an electrode spacing to the counter electrode CT to be positioned left smaller than that in the region A.

From this, it is apparent considering together the explanation on the counter electrode CT that in the region B of the pixel region the isolation distance between the counter electrode CT and the pixel electrode PX is formed smaller as compared to that in the region A.

In this case, considering an electric field occurring between the counter electrode CT and the pixel electrode PX in the region B, with respect to one electrode the parallel part of the protrusion of the other electrode has an electric field therebetween occurring in a perpendicular direction to them without any difference from an electric field direction in the region A.

However, in a vicinity of an area corresponding to a boundary between the portion formed with the protrusion and the portion not so formed, an electric field occurring there in direction has an angle with respect to an electric field direction in the region A. In this area, a substantial region B is formed.

In FIG. 25, the portion formed with an electrode protrusion and the portion not so formed have a boundary in a hatched continuous form. It is needless to say that a region B is to be formed from the above-stated reason even for a stepwise connected form (the portion formed with a protrusion and the portion not so formed have an angle of 90 degrees between them).

The technical effects of the region B thus structured will be made apparent hereafter with empirical data.

Incidentally, the common connection point PXC to the pixel electrode PX in an area superposed over the counter voltage signal line CT cooperates with the counter voltage signal line CT to structure therebetween a storage capacitor Cstg having the insulator film as a dielectric film. This storage capacitor Cstg provides an effect of storing image information on the pixel electrode PX, for example, when the thin film transistor TFT is off.

Also, phosphorus (P) is doped to a surface of the amorphous silicon AS corresponding to an interface between a drain electrode SD2 and a source electrode SD1 of the thin film transistor TFT mentioned before, into a high concentration layer. This provides ohmic contact on each electrode. In this case, the amorphous silicon As has the high concentration layer formed over an entire surface thereof. After forming each electrode, the electrode is used as a mask to etch the high concentration layer in areas other than the electrode forming area, thereby making it possible to provide the above structure.

Then, a protection film PSV, e.g. of a silicon nitride film, (see FIG. 3) is formed over a surface of the insulator film GI thus formed with the thin film transistors TFT, image signal lines DL, pixel electrodes PX and storage capacitors Cstg. An orientation film is formed on a surface of the protection film PSV.

The transparent substrate SUB1 thus structured is to be oppositely arranged, through a liquid crystal, with a transparent substrate SUB2 as the other substrate having a surface on the liquid crystal side formed with a black matrix BM and color filters FIL, etc.

In this case, the black matrix BM is satisfactorily formed to cover at least a gap of between an area of forming a thin film transistor TFT and image signal line DL and the adjacent counter electrode CT. This is because the thin film transistor TFT if having light illumination changes in its property causing light leak in the gap between the image signal line DL and the counter electrode CT. This situation is true for the case of Embodiment 1.

Figure 26:
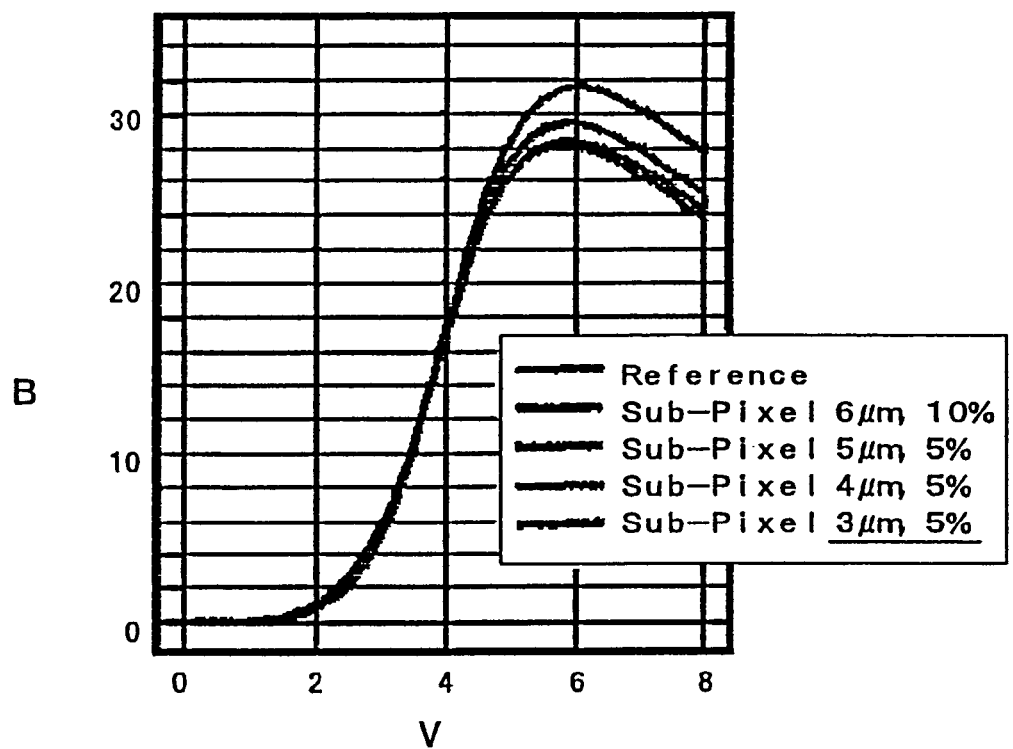
FIG. 26 is a graph showing a B vs. V characteristic of a pixel in a structure of a liquid crystal display device shown in FIG. 25.

FIG. 26 is a graph illustrating a B (transmissivity: luminance) vs. V (voltage between the counter electrode and the pixel electrode) characteristic in each pixel of a liquid crystal display device structured as above.

In the figure, characteristic are shown in order for cases as: characteristic where the invention is not applied (reference), characteristics where in a sub-pixel region (region B) the electrode spacing and opening area ratio are respectively given (6 µm, 10%), (5 µm, 5%), (4 µm, 5%) and (3 µm, 5%).

Here, the sub-pixel opening area ratio refers to a ratio of a sub-pixel area to one-pixel area.

As apparent from the figure, it is revealed that in middle tone (particularly, in a vicinity of a transmissivity of 4) a steep curve is smoothened by a presence of a sub-pixel region.

Figure 27:
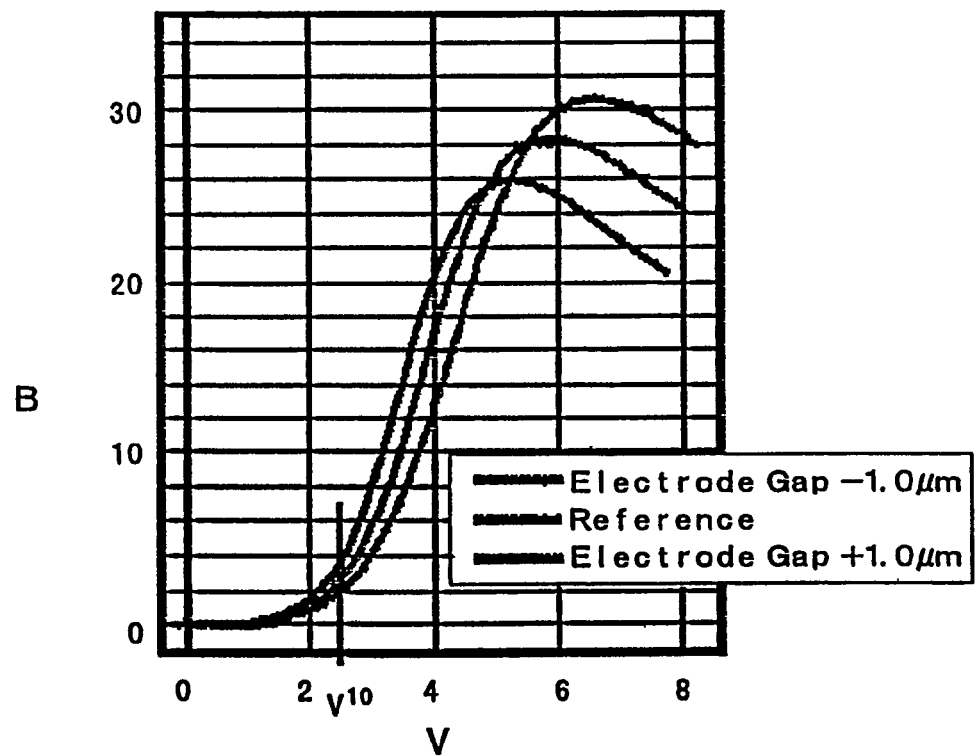
FIG. 27 is a graph showing a B vs. V characteristic of the pixel in the structure of the liquid crystal display device shown in FIG. 25.

Also, FIG. 27 is a graph illustrating a B vs. V characteristic where in the sub-pixel of the pixel (region B) the spacing between the counter electrode and the pixel electrode is varied in a liquid crystal display device structured as above.

Here, shown are cases that the opening area ratio in the sub-pixel part is taken 5% and the spacing between the counter electrode and the pixel electrode is varied respectively by .+−0.1.0 µm with respect to 3 µm as a reference state.

Figure 28:
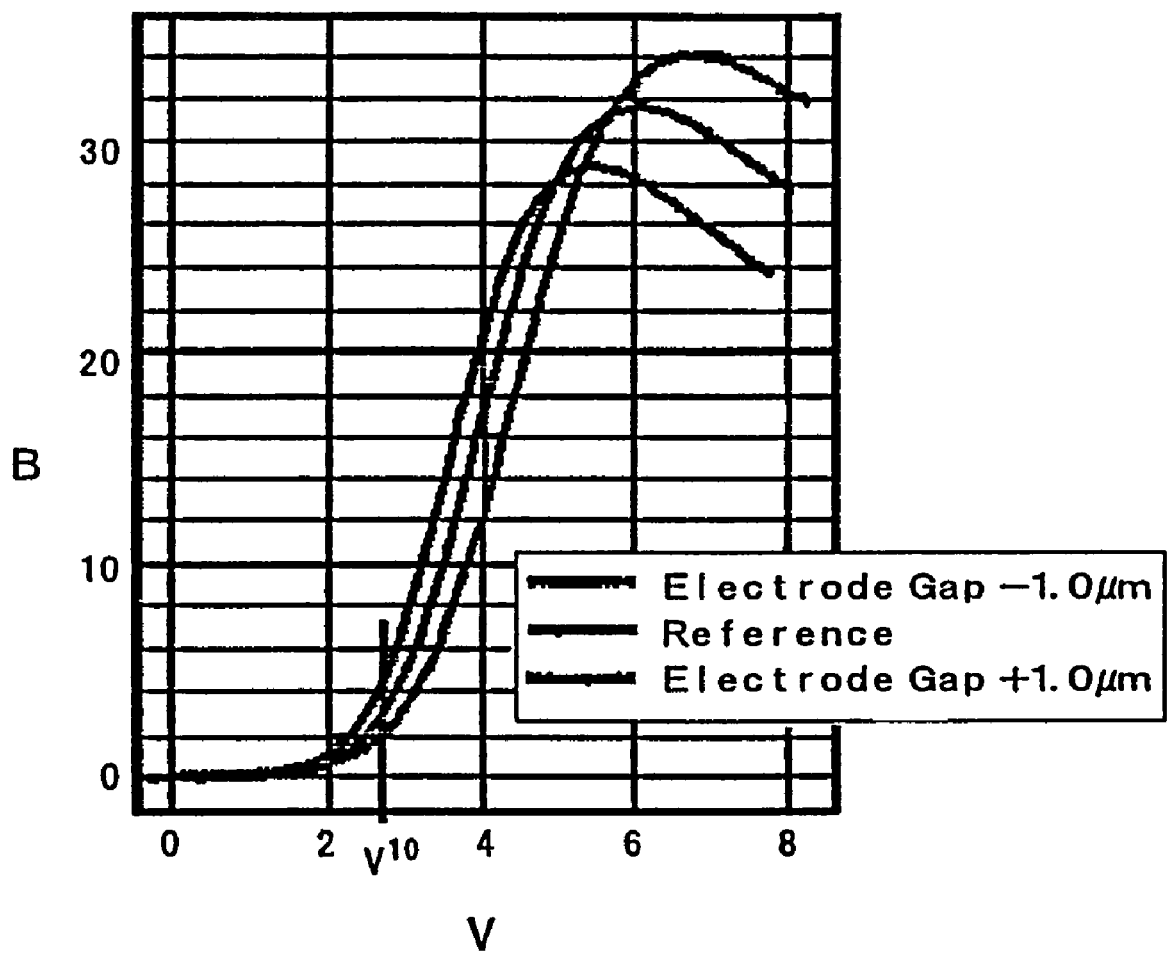
FIG. 28 is a graph showing a B vs. V characteristic of the pixel in the structure of the liquid crystal display device shown in FIG. 25.

On the other hand, FIG. 28 is a graph illustrating a B vs. V characteristic where the invention is not applied but the spacing between the counter electrode and the pixel electrode is varied. Illustrated are cases that the spacing between the counter electrode and the pixel electrode is varied respectively by .+−0.1.0 µm.

As apparent from the figures, it is revealed that luminance variation $\Delta B^{10}$ due to the electrode spacing change at a relative transmissivity of 10% ($V^{10}$) (shown by an arrowhead width in the figure) is greatly reduced by the provision of the narrow gap sub-pixel.

Incidentally, in the graph of the figure the transmissivity B where recognized by the human eye is recognized on log B and hence the variation width shown by the arrow in the figure be sensed with greater difference than that in the actual.

EMBODIMENT 3

In any of the above embodiments, the counter electrode CT and the pixel electrode PX are formed in parallel with the image signal line DL.

However, the invention is not limited to this. There is of course no necessity that the counter electrode CT and the pixel electrode PX be in parallel with the image signal line DL as shown, for example, in FIG. 29.

Figure 29:
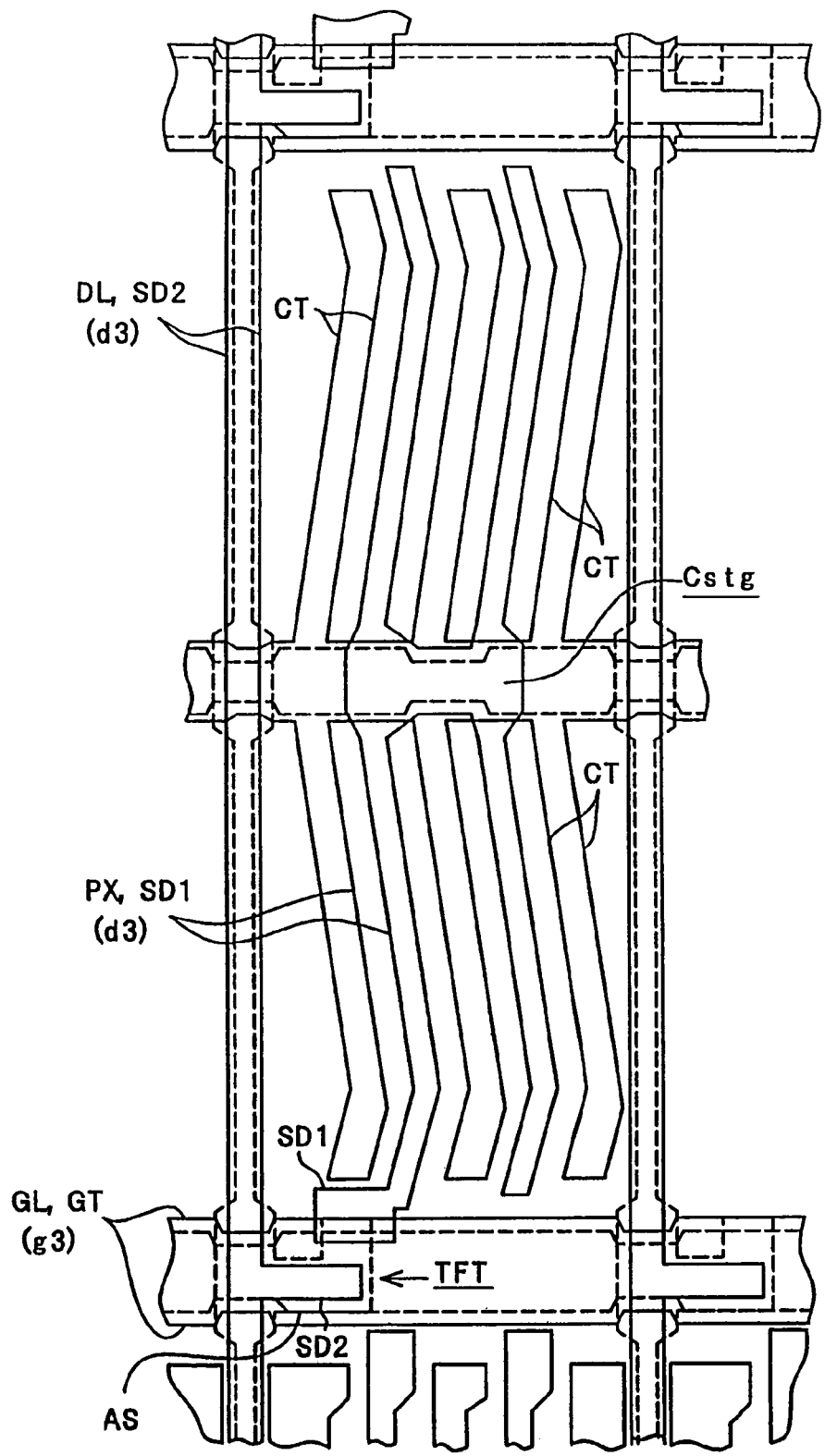
FIG. 29 is a structural view showing another embodiment according to the invention.

Similarly, it is satisfactory even where a pattern of the counter electrode CT and pixel electrode PX be not made as in the FIG. 29. This is because the invention is satisfactory provided that a main pixel region (region A) and a sub-pixel region (region B) exist in a light transmissive area of a pixel region wherein the sub-pixel region in pattern is fixed with respect to the pattern of the main pixel region under the conditions as concretely described in the present Specification.

Meanwhile, in the above embodiments the region A and the region B were provided in a manner dividing the pixel region, this is not necessarily limitative. It is needless to say that a similar effect is obtainable if there exist a plurality of regions A and regions B and these regions be formed in a mixed state.

EMBODIMENT 4

Figure 30:
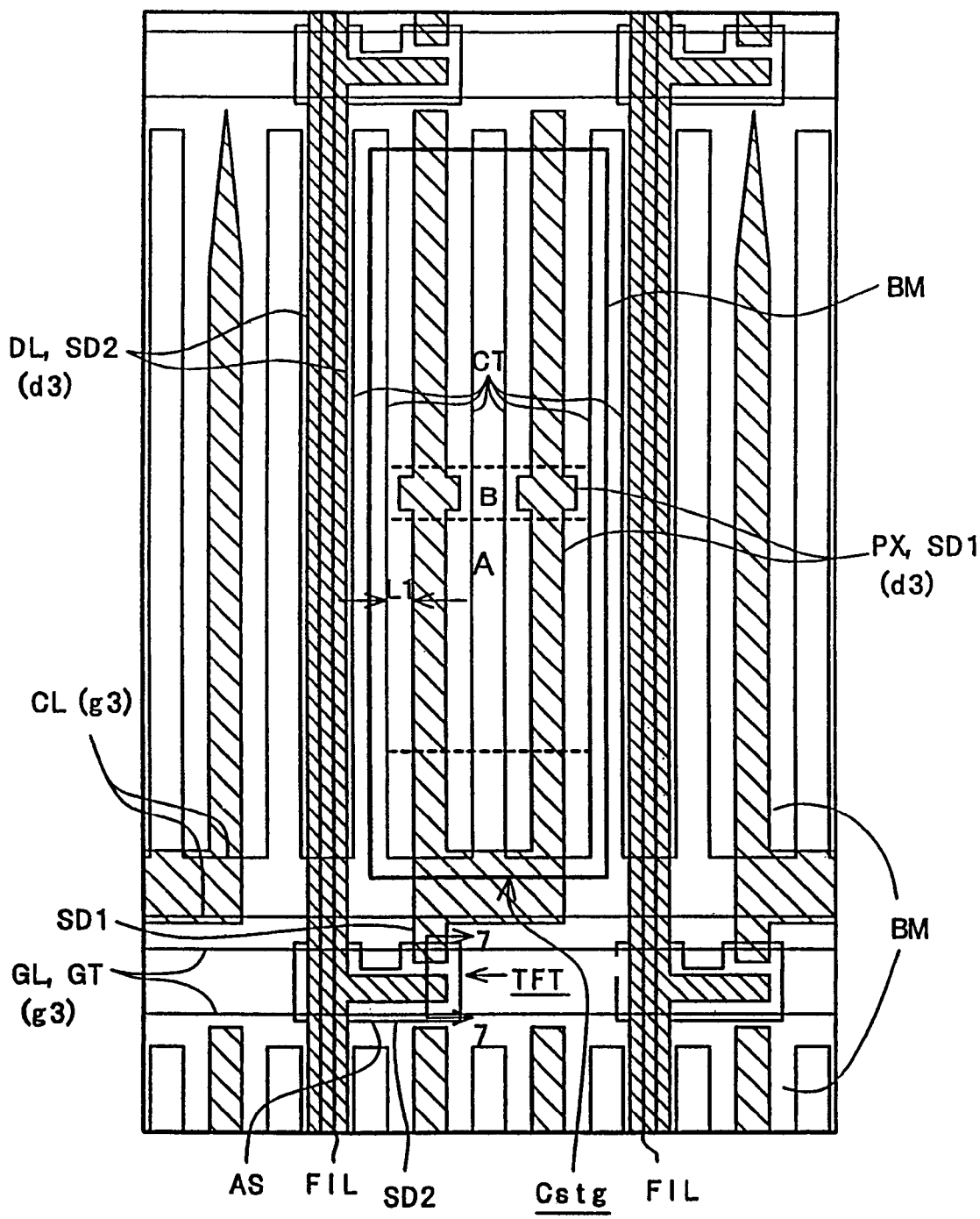
FIG. 30 is a structural view showing another embodiment according to the invention.

FIG. 30 is another embodiment having a structure having a region B provided nearly in a center of a light transmissive area in the pixel region, which is a figure corresponding, for example, to FIG. 23.

In FIG. 30, a region B is formed by forming an area comparatively wide in linewidth nearly in a center of the pixel electrode PX.

By doing so, the pixel electrode PX is formed with a part narrowed in distance to an adjacent counter electrode CT, in a vicinity of which a part will be formed having an electric field direction different from an electric field direction of a region A as another region.

Figure 32A:
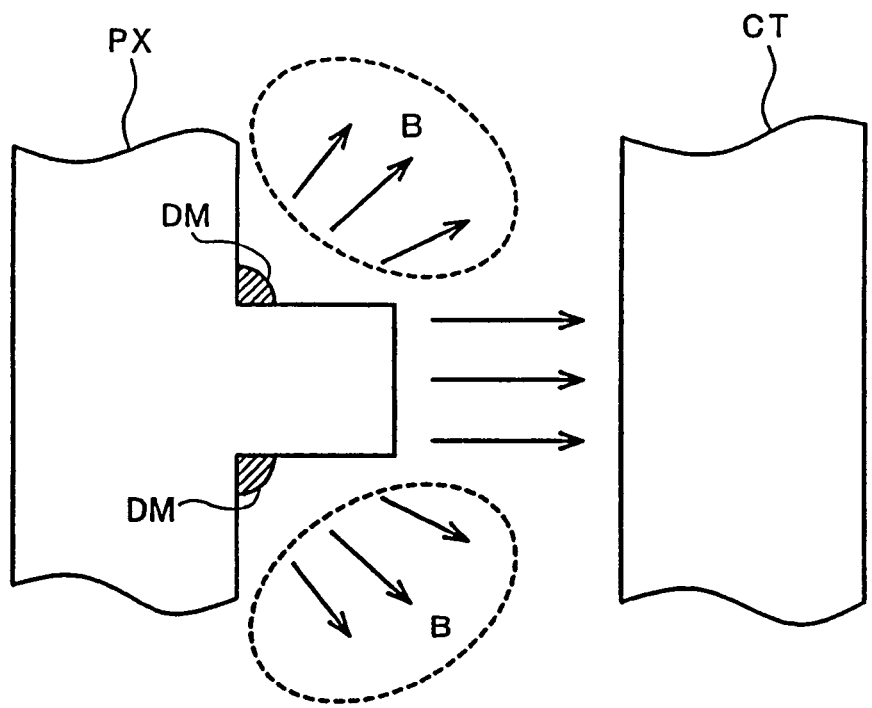
FIGS. 32A and 32B are explanatory views for explaining an effect by a structure of FIG. 30 and FIG. 31.

FIG. 32A is a magnifying view of this part wherein the direction of an electric field is shown by arrows given between the pixel electrode PX and the counter electrode CT.

As apparent from the figure, the formation of a width-increased portion in the pixel electrode forms an area different in electric field direction. This area serves as a region B.

Although this embodiment forms a comparatively widened linewidth area in the pixel electrode PX, it is needless to say that a similar effect is obtainable by providing a similar structure in the counter electrode CT.

Incidentally, it is needless to say that based on this structure the structure shown, for example, in FIG. 23 may be adopted together. In this case, the region B will exist in a divided state in respective light transmissive areas in the pixel region.

EMBODIMENT 5

Figure 31:
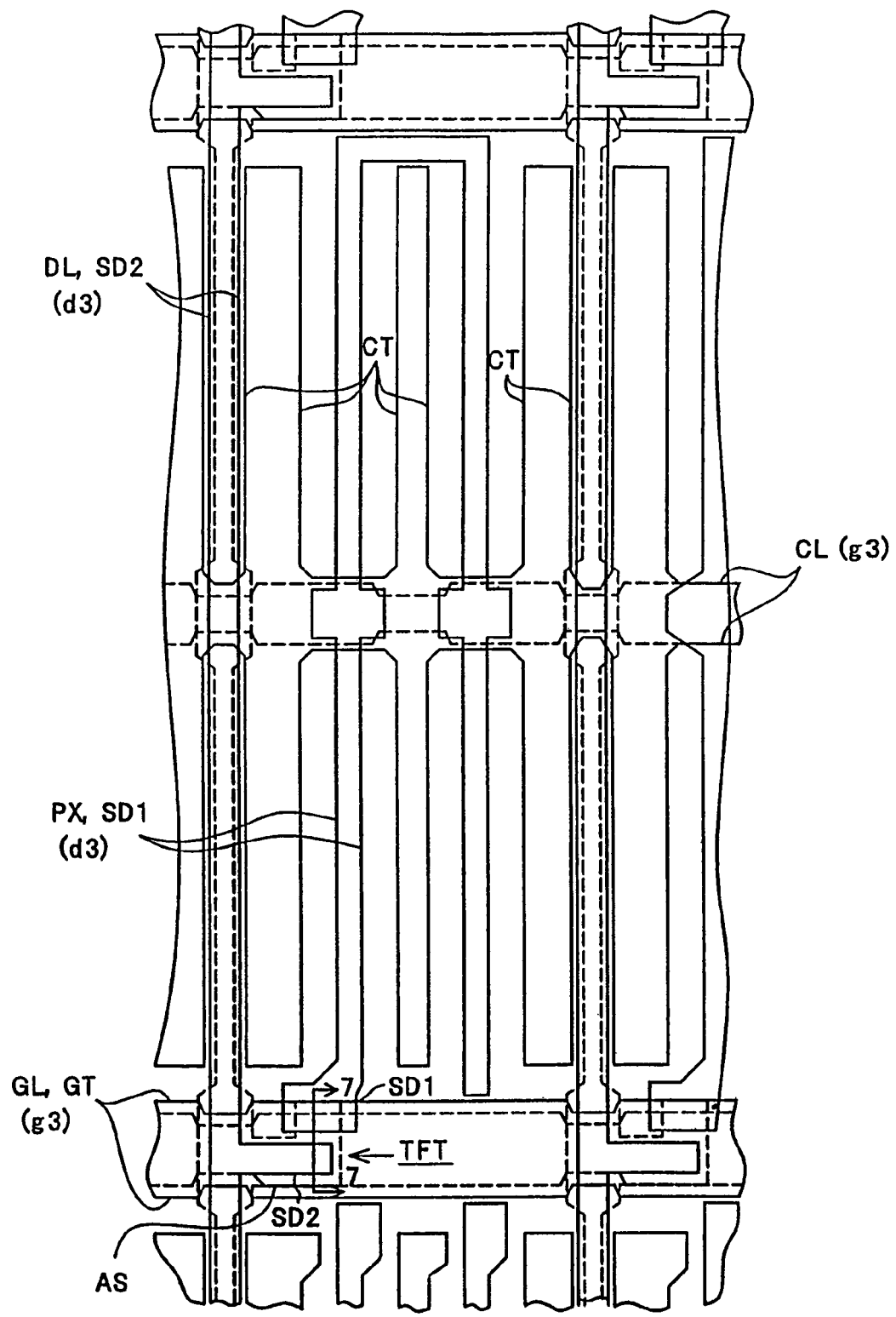
FIG. 31 is a structural view showing another embodiment according to the invention.

FIG. 31 is a structural view showing still another embodiment.

There is a case that, by forming an increased linewidth area (protrusion) in the pixel electrode PX of the FIG. 30 structure, an area is formed to cause a so-called domain DM in a corner between the pixel electrode PX and the protrusion as shown in FIG. 32A.

The domain DM is an area where an electric field occurs, for example, in a coincident direction with an axial direction of initially-oriented liquid crystal molecules, wherein the liquid crystal molecules if applied by an electric field will not twist, thus resulting in out of control in light transmissivity.

FIG. 31 is a view illustrating an embodiment to eliminate such a disadvantage, wherein the area where a domain DM is to occur is masked with a counter voltage signal line CL.

That is, the same figure corresponds to FIG. 25 or FIG. 29. In a pixel electrode PX formed intersecting a counter voltage signal line CL through an insulation film, the intersection is formed with an increased linewidth part (protrusion).

Figure 32B:
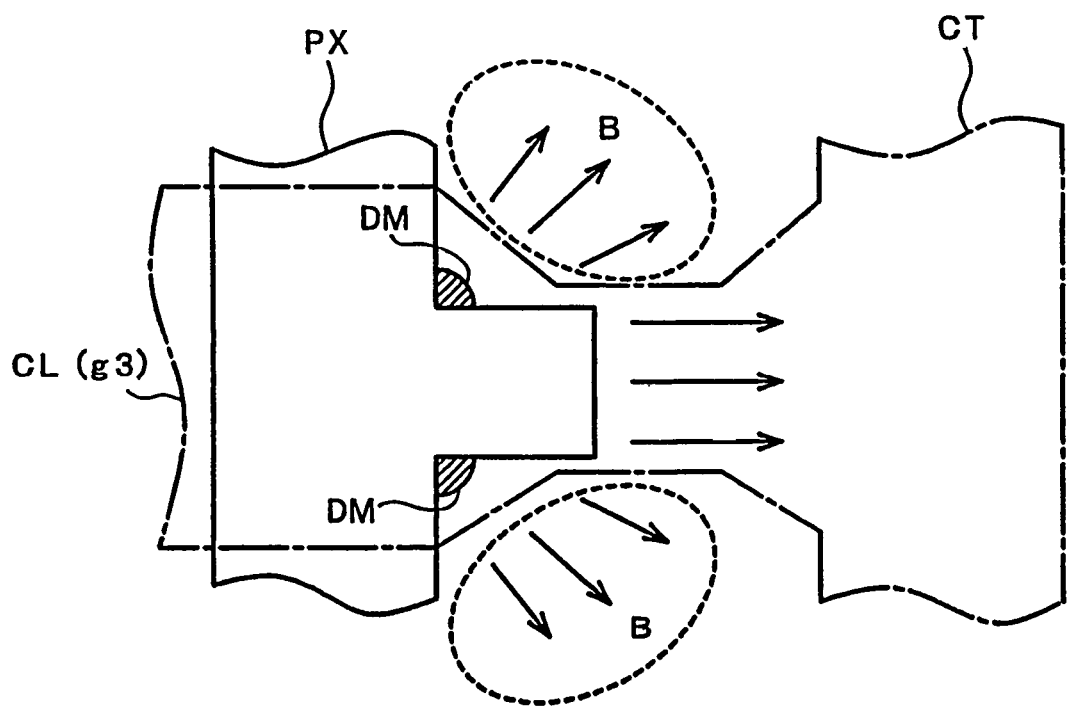

This makes it possible to mask only the area where a domain DM is to occur by the counter voltage signal line CL without masking the region B as shown in FIG. 32B.

In this case, the storage capacity Cstg is secured in the increased linewidth area in the pixel electrode PX. Meanwhile, the pixel electrodes PX in plurality are connected common in the part close to the scanning signal line GL (upper in the figure). As a result, the pixel electrode is formed in a squared-U form.

The method for masking for the Domain DM includes a method of masking with a black matrix BM. This structure may be made.

However, where masking by a counter voltage signal line CL, alignment accuracy is higher than that of black mask BM, thus providing an effect that masking can be made with accuracy only for the area of domain DM occurrence (without a possibility of masking part of the region B).

Incidentally, it is needless to say that, based on the structure of this embodiment, the structure shown, for example, in FIG. 25 or FIG. 29 may be adopted together. In this case, the region B will exist in a divided state in respective light transmissive areas in the pixel region.

As described in detail above, according to the present invention, in a liquid crystal display device of a lateral electric field scheme realizable a viewing angle in a Braun tube level, a liquid crystal display device can be provided which has a favorable image quality with even luminance but less unevenness of luminance even when the electrode spacing varies due to variation in photolithography or etching in forming electrodes.

What is claimed is:

1. A liquid crystal display device comprising:
a plurality of pixels, each of the plurality of pixels having a pixel electrode and a counter electrode;
a first region and a second region formed in each pixel,
wherein a distance between the pixel electrode and the counter electrode in the first region is different from a distance between the pixel electrode and the counter electrode in the second region, and
wherein in each pixel, a voltage vs. luminance characteristic curve in the first region is different from a voltage vs. luminance characteristic curve in the second region.

2. A liquid crystal display device according to claim 1, wherein the voltage vs. luminance characteristic curve in the first region and voltage vs. luminance characteristic curve in the second region have a crossing point.

3. A liquid crystal display device according to claim 1, wherein value of max transmittance in the first region is lower than in the second region, and value of voltage to meet the max transmittance in the first region is lower than in the second region.

4. A liquid crystal display device according to claim 1, angle of electrode in the first region and angle of electrode in the second region is different.

5. A liquid crystal display device according to claim 2, wherein a relative angle between the pixel electrode and the counter electrode in the first region is different from a relative angle between the pixel electrode and the counter electrode in the second region.

6. A liquid crystal display device according to claim 3, angle of electrode in the first region and angle of electrode in the second region is different.

7. A liquid crystal display device according to claim 1, distance between electrode in the first region and distance between electrode in the second region is different.

8. A liquid crystal display device according to claim 3, distance between electrode in the first region and distance between electrode in the second region is different.

9. A liquid crystal display device according to claim 1, angle of electrode in the first region and angle of electrode in the second region is different, and distance between electrode in the first region and distance between electrode in the second region is different.

10. A liquid crystal display device according to claim 3, angle of electrode in the first region and angle of electrode in the second region is different, and distance between electrode in the first region and distance between electrode in the second region is different.

11. A liquid crystal display device according to claim 1, wherein an area of the second region is smaller than an area of the first region.

12. A liquid crystal display device according to claim 1, wherein an area of the second region is in a range of 0.05 times to 0.3 times of an area of the first region.

13. A liquid crystal display device according to claim 1, wherein the distance between the pixel electrode and the counter electrode in the second region is smaller than the distance between the pixel electrode and the counter electrode in the first region.

* * * * *

UNITED STATES PATENT AND TRADEMARK OFFICE
CERTIFICATE OF CORRECTION

PATENT NO. : 7,599,031 B2
APPLICATION NO. : 11/373292
DATED : October 6, 2009
INVENTOR(S) : Ota et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Twenty-eighth Day of September, 2010

David J. Kappos
*Director of the United States Patent and Trademark Office*